United States Patent
Mahoney et al.

(10) Patent No.: US 9,961,058 B2
(45) Date of Patent: May 1, 2018

(54) SYSTEM AND METHOD OF MESSAGE ROUTING VIA CONNECTION SERVERS IN A DISTRIBUTED COMPUTING ENVIRONMENT

(71) Applicant: PTC Inc., Needham, MA (US)

(72) Inventors: Mike Mahoney, Needham, MA (US); Bob DeRemer, Needham, MA (US); Rick Bullotta, Phoenixville, PA (US)

(73) Assignee: PTC Inc., Needham, MA (US)

( * ) Notice: Subject to any disclaimer, the term of this patent is extended or adjusted under 35 U.S.C. 154(b) by 747 days.

(21) Appl. No.: 14/222,106

(22) Filed: Mar. 21, 2014

(65) Prior Publication Data

US 2015/0271301 A1    Sep. 24, 2015

(51) Int. Cl.
| | |
|---|---|
| *G06F 15/16* | (2006.01) |
| *H04L 29/06* | (2006.01) |
| *H04L 29/08* | (2006.01) |

(52) U.S. Cl.
CPC .......... *H04L 63/08* (2013.01); *H04L 63/0815* (2013.01); *H04L 67/1002* (2013.01)

(58) Field of Classification Search
CPC ............................ H04L 67/1002; H04L 41/22
See application file for complete search history.

(56) References Cited

U.S. PATENT DOCUMENTS

| | | |
|---|---|---|
| 3,656,112 A | 4/1972 | Paull |
| 3,916,412 A | 10/1975 | Amoroso, Jr. |
| 3,983,484 A | 9/1976 | Hodama |

(Continued)

FOREIGN PATENT DOCUMENTS

| | | |
|---|---|---|
| EP | 0497010 A2 | 8/1992 |
| EP | 1187015 A2 | 3/2002 |

(Continued)

OTHER PUBLICATIONS

Hart Server, retrieved from 2001 internet archive of hartcomm.org http://www.hartcomm.org/server2/index.html, 13 pages (2001).

(Continued)

*Primary Examiner* — Anthony Mejia
*Assistant Examiner* — Sm Z Islam
(74) *Attorney, Agent, or Firm* — Meunier Carlin & Curfman LLC

(57) ABSTRACT

A system and method of message routing messages via connections in a distributed computing environment. The method includes providing a platform server, a set of intermediary servers, and a set of edge servers. The method includes receiving, by a port at the platform server, a first data message from a first end-point device over a first persistent connection. The message has been routed through a an intermediate server over a second persistent connection. The method includes receiving a second data message from a second end-point device over a third persistent connection where the second data message has been routed through another intermediate server over a fourth persistent connection. The method includes servicing, by a processor at the platform server, the first data message and the second data message where the intermediate servers manage connectivity between the end-point devices and the platform servers.

15 Claims, 13 Drawing Sheets

(56) References Cited

U.S. PATENT DOCUMENTS

| | | |
|---|---|---|
| 4,063,173 A | 12/1977 | Nelson et al. |
| 4,103,250 A | 7/1978 | Jackson |
| 4,134,068 A | 1/1979 | Richardson |
| 4,216,546 A | 8/1980 | Litt |
| 4,554,668 A | 11/1985 | Deman et al. |
| 4,601,059 A | 7/1986 | Gammenthaler |
| 4,680,582 A | 7/1987 | Mejia |
| 4,704,585 A | 11/1987 | Lind |
| 4,887,204 A | 12/1989 | Johnson et al. |
| 4,979,170 A | 12/1990 | Gilhousen et al. |
| 5,113,416 A | 5/1992 | Lindell |
| 5,134,615 A | 7/1992 | Freeburg et al. |
| 5,159,704 A | 10/1992 | Pirolli et al. |
| 5,276,703 A | 1/1994 | Budin et al. |
| 5,361,401 A | 11/1994 | Pirillo |
| 5,422,889 A | 6/1995 | Sevenhans et al. |
| 5,454,010 A | 9/1995 | Leveque |
| 5,479,441 A | 12/1995 | Tymes et al. |
| 5,493,671 A | 2/1996 | Pitt et al. |
| 5,515,365 A | 5/1996 | Sumner et al. |
| 5,734,966 A | 3/1998 | Farrer et al. |
| 5,737,609 A | 4/1998 | Reed et al. |
| 5,805,442 A | 9/1998 | Crater et al. |
| 5,892,962 A | 4/1999 | Cloutier |
| 5,909,640 A | 6/1999 | Farrer et al. |
| 5,925,100 A | 7/1999 | Drewry et al. |
| 6,169,992 B1 | 1/2001 | Beall et al. |
| 6,182,252 B1 | 1/2001 | Wong et al. |
| 6,198,480 B1 | 3/2001 | Cotugno et al. |
| 6,377,162 B1 | 4/2002 | Delestienne et al. |
| 6,430,602 B1 | 8/2002 | Kay et al. |
| 6,473,788 B1 | 10/2002 | Kim et al. |
| 6,510,350 B1 | 1/2003 | Steen, III et al. |
| 6,553,405 B1 | 4/2003 | Desrochers |
| 6,570,867 B1 | 5/2003 | Robinson et al. |
| 6,618,709 B1 | 9/2003 | Sneeringer |
| 6,675,193 B1 | 1/2004 | Slavin et al. |
| 6,757,714 B1 | 6/2004 | Hansen |
| 6,766,361 B1 | 7/2004 | Venigalla |
| 6,797,921 B1 | 9/2004 | Niedereder et al. |
| 6,810,522 B2 | 10/2004 | Cook et al. |
| 6,813,587 B2 | 11/2004 | McIntyre et al. |
| 6,850,255 B2 | 2/2005 | Muschetto |
| 6,859,757 B2 | 2/2005 | Muehl et al. |
| 6,880,016 B1 | 4/2005 | Van Der Heijden et al. |
| 6,915,330 B2 | 7/2005 | Hardy et al. |
| 6,980,558 B2 | 12/2005 | Aramoto |
| 6,993,555 B2 | 1/2006 | Kay et al. |
| 7,031,520 B2 | 4/2006 | Tunney |
| 7,046,134 B2 | 5/2006 | Hansen |
| 7,047,159 B2 | 5/2006 | Muehl et al. |
| 7,054,922 B2 | 5/2006 | Kinney et al. |
| 7,082,383 B2 | 7/2006 | Baust et al. |
| 7,082,460 B2 | 7/2006 | Hansen et al. |
| 7,117,239 B1 | 10/2006 | Hansen |
| 7,149,792 B1 | 12/2006 | Hansen et al. |
| 7,178,149 B2 | 2/2007 | Hansen |
| 7,185,014 B1 | 2/2007 | Hansen |
| 7,250,862 B2 | 7/2007 | Bornhoevd et al. |
| 7,254,601 B2 | 8/2007 | Bailer et al. |
| 7,269,732 B2 | 9/2007 | Kilian-Kehr |
| 7,341,197 B2 | 3/2008 | Muehl et al. |
| 7,380,236 B2 | 5/2008 | Hawley |
| 7,496,911 B2 | 2/2009 | Rowley et al. |
| 7,529,570 B2 | 5/2009 | Shirota |
| 7,529,750 B2 | 5/2009 | Bair |
| 7,536,673 B2 | 5/2009 | Brendle et al. |
| 7,555,355 B2 | 6/2009 | Meyer |
| 7,566,005 B2 | 7/2009 | Heusermann et al. |
| 7,570,755 B2 | 8/2009 | Williams et al. |
| 7,587,251 B2 | 9/2009 | Hopsecger |
| 7,591,006 B2 | 9/2009 | Werner |
| 7,593,917 B2 | 9/2009 | Werner |
| 7,613,290 B2 | 11/2009 | Williams et al. |
| 7,616,642 B2 | 11/2009 | Anke et al. |
| 7,617,198 B2 | 11/2009 | Durvasula |
| 7,624,092 B2 | 11/2009 | Lieske et al. |
| 7,624,371 B2 | 11/2009 | Kulkarni et al. |
| 7,644,120 B2 | 1/2010 | Todorov et al. |
| 7,644,129 B2 | 1/2010 | Videlov |
| 7,647,407 B2 | 1/2010 | Omshehe et al. |
| 7,650,607 B2 | 1/2010 | Resnick et al. |
| 7,653,902 B2 | 1/2010 | Bozak et al. |
| 7,673,141 B2 | 3/2010 | Kilian-Kehr et al. |
| 7,684,621 B2 | 3/2010 | Tunney |
| 7,703,024 B2 | 4/2010 | Kautzleben et al. |
| 7,707,550 B2 | 4/2010 | Resnick et al. |
| 7,725,815 B2 | 5/2010 | Peters |
| 7,728,838 B2 | 6/2010 | Forney et al. |
| 7,730,498 B2 | 6/2010 | Resnick et al. |
| 7,743,015 B2 | 6/2010 | Schmitt |
| 7,743,155 B2 | 6/2010 | Pisharody et al. |
| 7,752,335 B2 | 7/2010 | Boxenhorn |
| 7,757,234 B2 | 7/2010 | Krebs |
| 7,761,354 B2 | 7/2010 | Kling et al. |
| 7,774,369 B2 | 8/2010 | Herzog et al. |
| 7,779,089 B2 | 8/2010 | Hessmer et al. |
| 7,779,383 B2 | 8/2010 | Bornhoevd et al. |
| 7,783,984 B2 | 8/2010 | Roediger et al. |
| 7,802,238 B2 | 9/2010 | Clinton |
| 7,814,044 B2 | 10/2010 | Schwerk |
| 7,814,208 B2 | 10/2010 | Stephenson et al. |
| 7,817,039 B2 | 10/2010 | Bornhoevd et al. |
| 7,827,169 B2 | 11/2010 | Enenkiel |
| 7,831,600 B2 | 11/2010 | Kilian |
| 7,840,701 B2 | 11/2010 | Hsu et al. |
| 7,852,861 B2 | 12/2010 | Wu et al. |
| 7,853,241 B1 | 12/2010 | Harrison |
| 7,853,924 B2 | 12/2010 | Curran |
| 7,860,968 B2 | 12/2010 | Bornhoevd et al. |
| 7,865,442 B1 | 1/2011 | Sowell |
| 7,865,731 B2 | 1/2011 | Kilian-Kehr |
| 7,865,939 B2 | 1/2011 | Schuster |
| 7,873,666 B2 | 1/2011 | Sauermann |
| 7,882,148 B2 | 2/2011 | Werner et al. |
| 7,886,278 B2 | 2/2011 | Stulski |
| 7,890,388 B2 | 2/2011 | Mariotti |
| 7,890,568 B2 | 2/2011 | Belenki |
| 7,895,115 B2 | 2/2011 | Bayyapu et al. |
| 7,899,777 B2 | 3/2011 | Baier et al. |
| 7,899,803 B2 | 3/2011 | Cotter et al. |
| 7,908,278 B2 | 3/2011 | Akkiraju et al. |
| 7,917,629 B2 | 3/2011 | Werner |
| 7,921,137 B2 | 4/2011 | Lieske et al. |
| 7,921,686 B2 | 4/2011 | Bagepalli et al. |
| 7,925,979 B2 | 4/2011 | Forney et al. |
| 7,937,370 B2 | 5/2011 | Hansen |
| 7,937,408 B2 | 5/2011 | Stuhec |
| 7,945,691 B2 | 5/2011 | Dharamshi |
| 7,953,219 B2 | 5/2011 | Freedman et al. |
| 7,954,107 B2 | 5/2011 | Mao et al. |
| 7,954,115 B2 | 5/2011 | Gisolfi |
| 7,966,418 B2 | 6/2011 | Shedrinsky |
| 7,975,024 B2 | 7/2011 | Nudler |
| 7,987,176 B2 | 7/2011 | Latzina et al. |
| 7,987,193 B2 | 7/2011 | Ganapam et al. |
| 7,992,200 B2 | 8/2011 | Kuehr-McLaren et al. |
| 8,000,991 B2 | 8/2011 | Montagut |
| 8,005,879 B2 | 8/2011 | Bornhoevd et al. |
| 8,024,218 B2 | 9/2011 | Kumar et al. |
| 8,024,743 B2 | 9/2011 | Werner |
| 8,051,045 B2 | 11/2011 | Vogler |
| 8,055,758 B2 | 11/2011 | Hansen |
| 8,055,787 B2 | 11/2011 | Victor et al. |
| 8,060,886 B2 | 11/2011 | Hansen |
| 8,065,397 B2 | 11/2011 | Taylor et al. |
| 8,069,362 B2 | 11/2011 | Gebhart et al. |
| 8,073,331 B1 | 12/2011 | Mazed |
| 8,074,215 B2 | 12/2011 | Cohen et al. |
| 8,081,584 B2 | 12/2011 | Thibault et al. |
| 8,082,322 B1 | 12/2011 | Pascarella et al. |
| 8,090,452 B2 | 1/2012 | Johnson et al. |
| 8,090,552 B2 | 1/2012 | Henry et al. |
| 8,095,632 B2 | 1/2012 | Hessmer et al. |

(56) References Cited

U.S. PATENT DOCUMENTS

| | | |
|---|---|---|
| 8,108,543 B2 | 1/2012 | Hansen |
| 8,126,903 B2 | 2/2012 | Lehmann et al. |
| 8,127,237 B2 | 2/2012 | Beringer |
| 8,131,694 B2 | 3/2012 | Bender et al. |
| 8,131,838 B2 | 3/2012 | Bornhoevd et al. |
| 8,136,034 B2 | 3/2012 | Stanton et al. |
| 8,145,468 B2 | 3/2012 | Fritzsche et al. |
| 8,145,681 B2 | 3/2012 | Macaleer et al. |
| 8,151,257 B2 | 4/2012 | Zachmann |
| 8,156,117 B2 | 4/2012 | Krylov et al. |
| 8,156,208 B2 | 4/2012 | Bornhoevd et al. |
| 8,156,473 B2 | 4/2012 | Heidasch |
| 8,183,995 B2 | 5/2012 | Wang et al. |
| 8,190,708 B1 | 5/2012 | Short et al. |
| 8,229,944 B2 | 7/2012 | Latzina et al. |
| 8,230,333 B2 | 7/2012 | Decherd et al. |
| 8,249,906 B2 | 8/2012 | Ponce de Leon |
| 8,250,169 B2 | 8/2012 | Beringer et al. |
| 8,254,249 B2 | 8/2012 | Wen et al. |
| 8,261,193 B1 | 9/2012 | Alur et al. |
| 8,271,935 B2 | 9/2012 | Lewis |
| 8,280,009 B2 | 10/2012 | Stepanian |
| 8,284,033 B2 | 10/2012 | Moran |
| 8,285,807 B2 | 10/2012 | Slavin et al. |
| 8,291,039 B2 | 10/2012 | Shedrinsky |
| 8,291,475 B2 | 10/2012 | Jackson et al. |
| 8,296,198 B2 | 10/2012 | Bhatt et al. |
| 8,296,266 B2 | 10/2012 | Lehmann et al. |
| 8,296,413 B2 | 10/2012 | Bornhoevd et al. |
| 8,301,770 B2 | 10/2012 | van Coppenolle et al. |
| 8,306,635 B2 | 11/2012 | Pryor |
| 8,312,383 B2 | 11/2012 | Gilfix |
| 8,321,790 B2 | 11/2012 | Sherrill et al. |
| 8,321,792 B1 | 11/2012 | Alur et al. |
| 8,331,855 B2 | 12/2012 | Williams et al. |
| 8,346,520 B2 | 1/2013 | Lu et al. |
| 8,359,116 B2 | 1/2013 | Manthey |
| 8,364,300 B2 | 1/2013 | Pouyez et al. |
| 8,370,479 B2 | 2/2013 | Hart et al. |
| 8,370,826 B2 | 2/2013 | Johnson et al. |
| 8,375,292 B2 | 2/2013 | Coffman et al. |
| 8,375,362 B1 | 2/2013 | Brette et al. |
| RE44,110 E | 3/2013 | Venigalla |
| 8,392,116 B2 | 3/2013 | Lehmann et al. |
| 8,392,561 B1 | 3/2013 | Dyer et al. |
| 8,396,929 B2 | 3/2013 | Helfman et al. |
| 8,397,056 B1 | 3/2013 | Malks et al. |
| 8,406,119 B2 | 3/2013 | Taylor et al. |
| 8,412,579 B2 | 4/2013 | Gonzalez |
| 8,417,764 B2 | 4/2013 | Fletcher et al. |
| 8,417,854 B2 | 4/2013 | Weng et al. |
| 8,423,418 B2 | 4/2013 | Hald et al. |
| 8,424,058 B2 | 4/2013 | Vinogradov et al. |
| 8,433,664 B2 | 4/2013 | Ziegler et al. |
| 8,433,815 B2 | 4/2013 | van Coppenolle et al. |
| 8,438,132 B1 | 5/2013 | Dziuk et al. |
| 8,442,933 B2 | 5/2013 | Baier et al. |
| 8,442,999 B2 | 5/2013 | Gorelik et al. |
| 8,443,069 B2 | 5/2013 | Bagepalli et al. |
| 8,443,071 B2 | 5/2013 | Lu et al. |
| 8,457,996 B2 | 6/2013 | Winkler et al. |
| 8,458,189 B1 | 6/2013 | Ludwig et al. |
| 8,458,315 B2 | 6/2013 | Miche et al. |
| 8,458,596 B1 | 6/2013 | Malks et al. |
| 8,458,600 B2 | 6/2013 | Dheap et al. |
| 8,473,317 B2 | 6/2013 | Santoso et al. |
| 8,478,861 B2 | 7/2013 | Taylor et al. |
| 8,484,156 B2 | 7/2013 | Hancsarik et al. |
| 8,489,527 B2 | 7/2013 | van Coppenolle et al. |
| 8,490,047 B2 | 7/2013 | Petschnigg et al. |
| 8,490,876 B2 | 7/2013 | Tan et al. |
| 8,495,072 B1 | 7/2013 | Kapoor et al. |
| 8,495,511 B2 | 7/2013 | Redpath |
| 8,495,683 B2 | 7/2013 | van Coppenolle et al. |
| 8,516,296 B2 | 8/2013 | Mendu |
| 8,516,383 B2 | 8/2013 | Bryant et al. |
| 8,521,621 B1 | 8/2013 | Hetzer et al. |
| 8,522,217 B2 | 8/2013 | Dutta et al. |
| 8,522,341 B2 | 8/2013 | Nochta et al. |
| 8,532,008 B2 | 9/2013 | Das et al. |
| 8,533,660 B2 | 9/2013 | Mehr et al. |
| 8,538,799 B2 | 9/2013 | Haller et al. |
| 8,543,568 B2 | 9/2013 | Wagenblatt |
| 8,547,838 B2 | 10/2013 | Lee et al. |
| 8,549,157 B2 | 10/2013 | Schnellbaecher |
| 8,555,248 B2 | 10/2013 | Brunswig et al. |
| 8,560,636 B2 | 10/2013 | Kieselbach |
| 8,560,713 B2 | 10/2013 | Moreira Sa de Souza et al. |
| 8,566,193 B2 | 10/2013 | Singh et al. |
| 8,571,908 B2 | 10/2013 | Li et al. |
| 8,572,107 B2 | 10/2013 | Fan et al. |
| 8,577,904 B2 | 11/2013 | Marston |
| 8,578,059 B2 | 11/2013 | Odayappan et al. |
| 8,578,328 B2 | 11/2013 | Kamiyama et al. |
| 8,578,330 B2 | 11/2013 | Dreiling et al. |
| 8,584,082 B2 | 11/2013 | Baird et al. |
| 8,588,765 B1 | 11/2013 | Harrison |
| 8,594,023 B2 | 11/2013 | He et al. |
| 8,635,254 B2 | 1/2014 | Harvey et al. |
| 8,689,181 B2 | 4/2014 | Biron, III |
| 8,745,641 B1 | 6/2014 | Coker |
| 8,752,074 B2 | 6/2014 | Hansen |
| 8,762,497 B2 | 6/2014 | Hansen |
| 8,769,095 B2 | 7/2014 | Hart et al. |
| 8,788,632 B2 | 7/2014 | Taylor et al. |
| 8,898,294 B2 | 11/2014 | Hansen |
| 9,002,980 B2 | 4/2015 | Shedrinsky |
| 2001/0027492 A1* | 10/2001 | Gupta ............... G06F 17/30887 709/245 |
| 2002/0099454 A1 | 7/2002 | Gerrity |
| 2002/0126703 A1 | 9/2002 | Kovacevic |
| 2002/0138596 A1 | 9/2002 | Darwin et al. |
| 2003/0005163 A1 | 1/2003 | Belzile |
| 2003/0093710 A1 | 5/2003 | Hashimoto et al. |
| 2003/0117280 A1 | 6/2003 | Prehn |
| 2004/0027376 A1 | 2/2004 | Calder et al. |
| 2004/0133635 A1 | 7/2004 | Spriestersbach et al. |
| 2004/0158455 A1 | 8/2004 | Spivack et al. |
| 2004/0158629 A1 | 8/2004 | Herbeck et al. |
| 2004/0177124 A1 | 9/2004 | Hansen |
| 2004/0255148 A1* | 12/2004 | Monteiro ............... G06Q 30/02 726/6 |
| 2005/0015369 A1 | 1/2005 | Styles et al. |
| 2005/0021506 A1 | 1/2005 | Sauermann et al. |
| 2005/0027675 A1 | 2/2005 | Schmitt et al. |
| 2005/0060186 A1 | 3/2005 | Blowers et al. |
| 2005/0102362 A1 | 5/2005 | Price et al. |
| 2005/0198137 A1 | 9/2005 | Pavlik et al. |
| 2005/0213563 A1 | 9/2005 | Shaffer et al. |
| 2005/0240427 A1 | 10/2005 | Crichlow |
| 2005/0289154 A1 | 12/2005 | Weiss et al. |
| 2006/0031520 A1* | 2/2006 | Bedekar ............... H04L 67/1027 709/227 |
| 2006/0089124 A1* | 4/2006 | Frank ............... H04L 63/0853 455/411 |
| 2006/0186986 A1 | 8/2006 | Ma et al. |
| 2006/0208871 A1 | 9/2006 | Hansen |
| 2007/0005736 A1 | 1/2007 | Hansen et al. |
| 2007/0016557 A1 | 1/2007 | Moore et al. |
| 2007/0027854 A1 | 2/2007 | Rao et al. |
| 2007/0027914 A1 | 2/2007 | Agiwal |
| 2007/0104180 A1 | 5/2007 | Aizu et al. |
| 2007/0162465 A1 | 7/2007 | Brueggemann et al. |
| 2007/0174158 A1 | 7/2007 | Bredehoeft et al. |
| 2007/0228163 A1* | 10/2007 | Schon ............... G06Q 10/06 235/383 |
| 2007/0260593 A1 | 11/2007 | Delvat |
| 2007/0266384 A1 | 11/2007 | Labrou et al. |
| 2007/0300172 A1 | 12/2007 | Runge et al. |
| 2008/0098085 A1 | 4/2008 | Krane et al. |
| 2008/0104615 A1 | 5/2008 | Nolan et al. |
| 2008/0172632 A1 | 7/2008 | Stambaugh |
| 2008/0208890 A1 | 8/2008 | Milam |
| 2008/0222599 A1 | 9/2008 | Nathan et al. |

(56) References Cited

U.S. PATENT DOCUMENTS

| | | |
|---|---|---|
| 2008/0231414 A1 | 9/2008 | Canosa |
| 2008/0244077 A1 | 10/2008 | Canosa |
| 2008/0244594 A1 | 10/2008 | Chen et al. |
| 2008/0255782 A1 | 10/2008 | Bilac et al. |
| 2008/0319947 A1 | 12/2008 | Latzina et al. |
| 2009/0006391 A1 | 1/2009 | Ram |
| 2009/0006467 A1 | 1/2009 | Visscher |
| 2009/0150431 A1 | 6/2009 | Schmidt et al. |
| 2009/0193148 A1 | 7/2009 | Jung et al. |
| 2009/0259442 A1 | 10/2009 | Gandikota et al. |
| 2009/0265760 A1 | 10/2009 | Zhu et al. |
| 2009/0299990 A1 | 12/2009 | Setlur et al. |
| 2009/0300060 A1 | 12/2009 | Beringer et al. |
| 2009/0319518 A1 | 12/2009 | Koudas et al. |
| 2009/0327337 A1 | 12/2009 | Lee et al. |
| 2010/0017379 A1 | 1/2010 | Naibo et al. |
| 2010/0017419 A1 | 1/2010 | Francis et al. |
| 2010/0064277 A1 | 3/2010 | Baird et al. |
| 2010/0077001 A1 | 3/2010 | Vogel et al. |
| 2010/0094843 A1 | 4/2010 | Cras |
| 2010/0125584 A1 | 5/2010 | Navas |
| 2010/0125826 A1 | 5/2010 | Rice et al. |
| 2010/0250440 A1 | 9/2010 | Wang et al. |
| 2010/0257242 A1 | 10/2010 | Morris |
| 2010/0281107 A1 | 11/2010 | Fallows et al. |
| 2010/0286937 A1 | 11/2010 | Hedley et al. |
| 2010/0287075 A1 | 11/2010 | Herzog et al. |
| 2010/0293360 A1 | 11/2010 | Schoop et al. |
| 2010/0332454 A1 | 12/2010 | Prahlad et al. |
| 2011/0078599 A1 | 3/2011 | Guertler et al. |
| 2011/0078600 A1 | 3/2011 | Guertler et al. |
| 2011/0099190 A1 | 4/2011 | Kreibe |
| 2011/0137883 A1 | 6/2011 | Lagad et al. |
| 2011/0138354 A1 | 6/2011 | Hertenstein et al. |
| 2011/0145712 A1 | 6/2011 | Pontier et al. |
| 2011/0145933 A1 | 6/2011 | Gambhir et al. |
| 2011/0153505 A1 | 6/2011 | Brunswig et al. |
| 2011/0154226 A1 | 6/2011 | Guertler et al. |
| 2011/0161409 A1 | 6/2011 | Nair et al. |
| 2011/0173203 A1 | 7/2011 | Jung et al. |
| 2011/0173220 A1 | 7/2011 | Jung et al. |
| 2011/0173264 A1 | 7/2011 | Kelly |
| 2011/0208788 A1 | 8/2011 | Heller et al. |
| 2011/0209069 A1 | 8/2011 | Mohler |
| 2011/0219327 A1 | 9/2011 | Middleton, Jr. et al. |
| 2011/0222838 A1 | 9/2011 | Dachiku |
| 2011/0231592 A1 | 9/2011 | Bleier et al. |
| 2011/0276360 A1 | 11/2011 | Barth et al. |
| 2011/0307295 A1 | 12/2011 | Steiert et al. |
| 2011/0307363 A1 | 12/2011 | N et al. |
| 2011/0307405 A1 | 12/2011 | Hammer et al. |
| 2011/0320525 A1 | 12/2011 | Agarwal et al. |
| 2012/0005577 A1 | 1/2012 | Chakra et al. |
| 2012/0059856 A1 | 3/2012 | Kreibe et al. |
| 2012/0072435 A1 | 3/2012 | Han |
| 2012/0072885 A1 | 3/2012 | Taragin et al. |
| 2012/0078959 A1 | 3/2012 | Cho et al. |
| 2012/0096429 A1 | 4/2012 | Desai et al. |
| 2012/0131473 A1 | 5/2012 | Biron, III |
| 2012/0136649 A1 | 5/2012 | Freising et al. |
| 2012/0143970 A1 | 6/2012 | Hansen |
| 2012/0144370 A1 | 6/2012 | Kemmler et al. |
| 2012/0150859 A1 | 6/2012 | Hu |
| 2012/0158825 A1* | 6/2012 | Ganser ............... G06F 17/3089 709/203 |
| 2012/0158914 A1 | 6/2012 | Hansen |
| 2012/0166319 A1 | 6/2012 | Deledda et al. |
| 2012/0167006 A1 | 6/2012 | Tillert et al. |
| 2012/0173671 A1 | 7/2012 | Callaghan et al. |
| 2012/0179905 A1 | 7/2012 | Ackerly |
| 2012/0197488 A1 | 8/2012 | Lee et al. |
| 2012/0197852 A1 | 8/2012 | Dutta et al. |
| 2012/0197856 A1 | 8/2012 | Banka et al. |
| 2012/0197898 A1 | 8/2012 | Pandey et al. |
| 2012/0197911 A1 | 8/2012 | Banka et al. |
| 2012/0239381 A1 | 9/2012 | Heidasch |
| 2012/0239606 A1 | 9/2012 | Heidasch |
| 2012/0254825 A1 | 10/2012 | Sharma et al. |
| 2012/0259932 A1 | 10/2012 | Kang et al. |
| 2012/0284259 A1 | 11/2012 | Jehuda |
| 2012/0290714 A1* | 11/2012 | Cohen ............... G06F 11/00 709/224 |
| 2012/0311501 A1 | 12/2012 | Nonez et al. |
| 2012/0311526 A1 | 12/2012 | DeAnna et al. |
| 2012/0311547 A1 | 12/2012 | DeAnna et al. |
| 2012/0324066 A1 | 12/2012 | Alam et al. |
| 2013/0006400 A1 | 1/2013 | Caceres et al. |
| 2013/0036137 A1 | 2/2013 | Ollis et al. |
| 2013/0054563 A1 | 2/2013 | Heidasch |
| 2013/0060791 A1 | 3/2013 | Szalwinski et al. |
| 2013/0067031 A1 | 3/2013 | Shedrinsky |
| 2013/0067302 A1 | 3/2013 | Chen et al. |
| 2013/0073969 A1 | 3/2013 | Blank et al. |
| 2013/0080898 A1 | 3/2013 | Lavian et al. |
| 2013/0110496 A1 | 5/2013 | Heidasch |
| 2013/0110861 A1 | 5/2013 | Roy et al. |
| 2013/0124505 A1 | 5/2013 | Bullotta et al. |
| 2013/0124616 A1 | 5/2013 | Bullotta et al. |
| 2013/0125053 A1 | 5/2013 | Brunswig et al. |
| 2013/0132385 A1 | 5/2013 | Bullotta et al. |
| 2013/0166563 A1 | 6/2013 | Mueller et al. |
| 2013/0166568 A1 | 6/2013 | Binkert et al. |
| 2013/0166569 A1 | 6/2013 | Navas |
| 2013/0173062 A1 | 7/2013 | Koenig-Richardson |
| 2013/0179565 A1 | 7/2013 | Hart et al. |
| 2013/0185593 A1 | 7/2013 | Taylor et al. |
| 2013/0185786 A1 | 7/2013 | Dyer et al. |
| 2013/0191767 A1 | 7/2013 | Peters et al. |
| 2013/0207980 A1 | 8/2013 | Ankisettipalli et al. |
| 2013/0211555 A1 | 8/2013 | Lawson et al. |
| 2013/0246897 A1 | 9/2013 | O'Donnell |
| 2013/0246906 A1 | 9/2013 | Hamon |
| 2013/0262641 A1 | 10/2013 | Zur et al. |
| 2013/0275344 A1 | 10/2013 | Heidasch |
| 2013/0275550 A1 | 10/2013 | Lee et al. |
| 2013/0290441 A1 | 10/2013 | Levy |
| 2013/0304581 A1 | 11/2013 | Soroca et al. |
| 2014/0016455 A1 | 1/2014 | Ruetschi et al. |
| 2014/0019432 A1 | 1/2014 | Lunenfeld |
| 2014/0032531 A1 | 1/2014 | Ravi et al. |
| 2014/0040286 A1 | 2/2014 | Bane et al. |
| 2014/0040433 A1 | 2/2014 | Russell, Jr. et al. |
| 2014/0095211 A1 | 4/2014 | Gloerstad et al. |
| 2014/0164358 A1 | 6/2014 | Benzatti |
| 2014/0223334 A1 | 8/2014 | Jensen et al. |
| 2014/0282370 A1 | 9/2014 | Schaefer et al. |
| 2015/0007199 A1 | 1/2015 | Valeva et al. |
| 2015/0058833 A1 | 2/2015 | Venkata |
| 2015/0127810 A1 | 5/2015 | Cao et al. |
| 2015/0271109 A1 | 9/2015 | Bullotta et al. |
| 2015/0271229 A1 | 9/2015 | Bullotta et al. |
| 2015/0271271 A1 | 9/2015 | Bullotta et al. |
| 2015/0271272 A1 | 9/2015 | Mahoney et al. |
| 2015/0271295 A1 | 9/2015 | Mahoney et al. |
| 2015/0271299 A1 | 9/2015 | Bullotta et al. |

FOREIGN PATENT DOCUMENTS

| | | | |
|---|---|---|---|
| WO | WO-99/21152 A1 | 4/1999 | |
| WO | WO-00/77592 A2 | 12/2000 | |
| WO | WO-2008/115995 A1 | 9/2008 | |
| WO | WO2012/164239 * | 5/2012 | ............ H04W 28/02 |
| WO | WO-2014/145084 A1 | 9/2014 | |

OTHER PUBLICATIONS

Ray, Erik T., Learning XML, First Edition, 277 pages (2001).
International Search Report, PCT/US2015/021867, 4 pages, dated Jul. 31, 2015.
International Search Report, PCT/US2015/021882, 4 pages, dated Jul. 30, 2015.
Written Opinion, PCT/US2015/021867, 12 pages, dated Jul. 31, 2015.

(56) References Cited

OTHER PUBLICATIONS

Written Opinion, PCT/US2015/021882, 13 pages, dated Jul. 30, 2015.
Shi, L. et al., Understanding Text Corpora with Multiple Facets, IEEE Symposium on Visual Analytics Science and Technology (VAST), 99-106 (2010).

* cited by examiner

| | | |
|---|---|---|
| 000 00001 (0x01) | GET | |
| 000 00010 (0x02) | PUT | |
| 000 00011 (0x03) | POST | |
| 000 00100 (0x04) | DELETE | ⎫ 318 |
| 000 01010 (0x0A) | BIND | |
| 000 01011 (0x0B) | UNBIND | |
| 000 11000 (0x14) | AUTH | |
| 000 11111 (0x1F) | KEEP_ALIVE | ⎭ |
| | | |
| 01000000 (0x40) | STATUS_SUCCESS((short)200,(byte)0x40), | } 320 |
| | | |
| 01000001 (0x41) | STATUS_CREATED((short)201,(byte)0x41), | ⎫ |
| 01000010 (0x42) | STATUS_ACCEPTED((short)202,(byte)0x42), | |
| 01000100 (0x44) | STATUS_NO_CONTENT((short)204,(byte)0x44), | |
| 01000110 (0x46) | STATUS_PARTIAL_CONTENT((short)206,(byte)0x46), | |
| 01100000 (0x60) | STATUS_MULTIPLE_CHOICES((short)300,(byte)0x60), | |
| 01100001 (0x61) | STATUS_MOVED_PERMANENTLY((short)301,(byte)0x61), | |
| 01100010 (0x62) | STATUS_FOUND((short)302,(byte)0x62), | |
| 01100011 (0x63) | STATUS_SEE_OTHER((short)303,(byte)0x63), | |
| 01100100 (0x64) | STATUS_NOT_MODIFIED((short)304,(byte)0x64), | |
| 01100101 (0x65) | STATUS_USE_PROXY((short)305,(byte)0x65), | |
| 01100111 (0x67) | STATUS_TEMPORARY_REDIRECT((short)307,(byte)0x67), | 322 |
| 10000000 (0x80) | STATUS_BAD_REQUEST((short)400,(byte)0x80), | |
| 10000001 (0x81) | STATUS_UNAUTHORIZED((short)401,(byte)0x81), | |
| 10000010 (0x82) | STATUS_PAYMENT_REQUIRED((short)402,(byte)0x82), | |
| 10000011 (0x83) | STATUS_FORBIDDEN((short)403,(byte)0x83), | |
| 10000100 (0x84) | STATUS_NOT_FOUND((short)404,(byte)0x84), | |
| 10000101 (0x85) | STATUS_METHOD_NOT_ALLOWED((short)405,(byte)0x85), | |
| 10000110 (0x86) | STATUS_NOT_ACCEPTABLE((short)406,(byte)0x86), | |
| 10001000 (0x88) | STATUS_REQUEST_TIMEOUT((short)408,(byte)0x88), | |
| 10001001 (0x89) | STATUS_CONFLICT((short)409,(byte)0x89), | |
| 10010010 (0x92) | STATUS_I_AM_A_TEAPOT((short)418,(byte)0x92), | |
| 10010100 (0x94) | STATUS_I_AM_BUZZED((short)420,(byte)0x94), | ⎭ |
| | | |
| 10100000 (0xA0) | STATUS_INTERNAL_ERROR((short)500,(byte)0xA0), | ⎫ |
| 10100001 (0xA1) | STATUS_NOT_IMPLEMENTED((short)501,(byte)0xA1), | |
| 10100010 (0xA2) | STATUS_BAD_GATEWAY((short)502,(byte)0xA2), | |
| 10100011 (0xA3) | STATUS_SERVICE_UNAVAILABLE((short)503,(byte)0xA3), | 324 |
| 10100100 (0xA4) | STATUS_GATEWAY_TIMEOUT((short)504,(byte)0xA4), | |
| 11100000 (0xE0) | STATUS_COMM_ERROR ((short)700,(byte)0xE0), | |
| 11100001 (0xE1) | STATUS_SERVER_REFUSED((short)701,(byte)0xE1), | |
| 11100010 (0xE2) | STATUS_SERVER_UNAVAILABLE((short)702,(byte)0xE2), | |
| 11100011 (0xE3) | STATUS_COMM_TIMEOUT((short)703,(byte)0xE3) | ⎭ |

FIG. 4

SYSTEM AND METHOD OF MESSAGE ROUTING VIA CONNECTION SERVERS IN A DISTRIBUTED COMPUTING ENVIRONMENT

FIELD OF THE INVENTION

This invention generally relates to operations of a distributing computing environment. More particularly, in certain embodiments, the invention relates to using intermediary (i.e., connection) servers to manage persistent connectivity between end-point devices and platform servers in a distributed computing environment.

BACKGROUND

The business of building a connected world, also referred to as the Internet of Things, is rapidly growing. Some industry analysts have estimated that the number of connected devices and systems (in an industrial, consumer, government, and business setting) may rise from five billion devices to a trillion devices over the next ten years.

A given cluster of devices may include upwards of hundreds of thousands of devices or more. Persistence connectivity can be used to lower the CPU and memory usage for a given connection, which reduces the cost of such connectivity and is, particularly, beneficial when there are such a vast number of connected devices. Persistence connectivity generally refers to a single connection between devices, which once established is used to send and receive multiple requests/responses between the devices.

In one type of distributed computing architecture, one or more business logic servers (referred to as a "platform servers") are employed to service data and information for hundreds of thousands or more computing devices. These servers may be designated, for example, based on a given geographic region. For example, a platform server may service a group of devices in North America or the East Coast. The number of devices connecting to these servers typically exceeds the resource capacity of such servers. To this end, intermediary servers may be employed to manage the connections between the computing devices and the platform servers. Because of the potential benefit in efficiency operation, persistent connectivity may reduce the number of intermediary servers or platform servers necessary to provide data service to a given number of computing devices.

When operating a load-balanced service, maintaining information that must or should be kept across the multiple requests in a user's session is useful. This information is typically referred to as a session state. A common example of an application that uses session state is a Web browser that uses cookies. However, a typical persistence connections between two network nodes use each other's network configuration. To this end, multiplexing persistence connection may cause the state information to be lost.

SUMMARY

In general overview, an intermediary party provides a software library and computing architecture for building a federation of distributed computing systems to service data for a vast number of computing devices. To achieve connectivity to a large number of devices, the federation generally includes multiple server nodes to share the workload. The server nodes can be logical/virtual or physical.

In some implementations, a platform server communicates to a given computing device across one or more intermediary servers over persistent connections. The platform routes data to and from data storage servers and various back-end servers that provide services to the computing devices. To this end, the intermediary servers multiplex messages sent from an persistent connections established with the edge servers to an persistent connection established with the platform server.

To maintain these persistent connections, formed among the devices within the federation while allowing a given computing device to freely move within the system, the edge and intermediary servers preferably operate using one or more non-network addressable identifiers associated to a given computing device.

In some implementations, messages sent across the persistent connections include a name identifier associated only with a given computing system. This feature beneficially allows the computing device to be serviced by the federation while being connected to any edge server within the federation. To this end, the computing device does not need to have any knowledge of the device's own location or any networking or routing details about nodes within the federation. The computing devices merely has to register, by providing its name and a corresponding security key (in some implementations), to a given edge server, to which the device is automatically bound to a path within the federation.

In some implementations, the intermediary servers may maintain and enforce authentication state for a given computing device within the federation. The intermediary servers may maintain the authentication state for a given session with a computing device once the credentials of the computing device is verified. In doing so, the platform server distributes the management of the authentication session to the intermediary server while allowing the platform to still perform the authentication.

In some implementations, the intermediary servers are stateless connection managers in that the intermediary server does not maintain state information of messages that it sends or receives. To this end, data and information may be pipelined to independently operating intermediary servers, which may, thus, share connectivity work load with various intermediary servers.

Applications for the systems and methods described herein are not limited to the aforementioned examples, but may be deployed in any number of contexts, as would be understood by one of ordinary skill in the art. Contents of the background are not to be considered as an admission of the contents as prior art.

In one aspect, the present disclosure describes a method of message routing using a name-based identifier in a distributed computing environment. The method may include providing a platform server, a set of intermediary servers, and a set of edge servers, collectively defining a network where an end-point device communicates to an edge server of the set of edge servers, the set of edge servers communicates to the set of intermediary servers, and the set of intermediary servers communicates to a platform server.

In some implementations, the method may include binding, at a platform server, at a first instance, the end-point device to the platform server wherein the platform server binds, at the first instance, the end-point device using a non-addressable name value associated to the end-point device. The binding, at the first instance, associates a first path across the network where the first path is defined between the end-point device and the platform server across one or more intermediary servers and one or more edge servers.

In some implementations, the method may include communicating, at the platform server, a first message to the end-point device along the first path.

In some implementations, the method may include rebinding, at the platform server, at a second instance, the end-point device to the platform server where the platform server binds, at the second instance the end-point device, using the non-addressable name value associated to the end-point device. The non-addressable name value may include a character string. The rebinding, at the second instance, associates a second path across the network where the second path is defined between the end-point device and the platform server across one or more intermediary servers and one or more edge servers, including a second intermediary server.

In some implementations, the method may include communicating, at the platform server, a second message to the end-point device along the second path. Each of the first path and the second path may include a connection handle to an established persistent connection. The established persistent connection may include a WebSocket connection. At least one of the first path and the second path may include at least two intermediary servers.

In some implementations, the method may include receiving, at the platform server, at a given instance between the first and second instances, a request to unbind the end-point device from the platform server where the platform server unbinds the end-point device based on the unbind request and where the unbinding dissociates the first path defined between the end-point device and the platform server.

In some implementations, the method may include binding, at the platform server, at the first instance, a second end-point device to the platform server where the platform server binds, at the first instance, the second end-point device based on a second non-addressable name value associated to the second end-point device. The binding of the first end-point device and the binding of the second end-point device may be the result of a single bind request.

In one aspect, the present disclosure describes a system including a processor and a memory, the memory storing instruction that, when executed by the processor, cause the processor to bind, at a first instance, the end-point device using a non-addressable name value associated to the end-point device. The binding, at the first instance, associates a first path across the network where the first path is defined between the end-point device and the bound server across one or more intermediary servers and one or more edge servers.

In some implementations, the instructions, when executed, further cause the processor to communicate a first message to the end-point device along the first path.

In some implementations, the instructions, when executed, further cause the processor to rebind at a second instance using the non-addressable name value associated to the end-point device. The non-addressable name value may include a character string. The rebinding, at the second instance, associates a second path across the network where the second path is defined between the end-point device and the bound server across one or more intermediary servers and one or more edge servers.

In some implementations, the instructions, when executed, further cause the processor to communicate a second message to the end-point device along the second path. Each of the first path and the second path may include a connection handle to an established persistent connection. The established persistent connection may include a WebSocket connection. At least one of the first path and the second path may include at least two intermediary servers.

In some implementations, the instructions, when executed, further cause the processor to receive a request to unbind the end-point device from the bound server based on the unbind request where the unbinding dissociates the first path defined between the end-point device and the bound server.

In one aspect, the present disclosure describes a non-transitory computer readable medium having instructions stored thereon, where the instructions, when executed by a processor, cause the processor to bind, at a first instance, the end-point device using a non-addressable name value associated to the end-point device. The binding, at the first instance, associates a first path across the network where the first path is defined between the end-point device and the bound server across one or more intermediary servers and one or more edge servers.

In some implementations, the instructions, when executed, further cause the processor to communicate a first message to the end-point device along the first path.

In some implementations, the instructions, when executed, further cause the processor to rebind at a second instance using the non-addressable name value associated to the end-point device. The non-addressable name value may include a character string. The rebinding, at the second instance, associates a second path across the network where the second path is defined between the end-point device and the bound server across one or more intermediary servers and one or more edge servers.

In some implementations, the instructions, when executed, further cause the processor to communicate a second message to the end-point device along the second path. Each of the first path and the second path may include a connection handle to an established persistent connection. The established persistent connection may include a WebSocket connection. At least one of the first path and the second path may include at least two intermediary servers.

In some implementations, the instructions, when executed, further cause the processor to receive a request to unbind the end-point device from the bound server based on the unbind request where the unbinding dissociates the first path defined between the end-point device and the bound server.

In one aspect, the present disclosure describes a method of routing messages in a distributed computing environment between a platform server and an end-point device. The method may include providing a platform server and one or more intermediate servers where each of the intermediate servers connects and maintains a persistent connection to the platform server and where the intermediate servers communicate and maintain a number of persistent connections with a number of edge servers. The intermediate server may not maintain state information associated with message content embedded within the given message.

In some implementations, the method may include receiving, by a port at a given intermediate server, a service request from a given edge server of the edge servers over a first persistent connection.

In some implementations, the method may include inserting, by the processor at the intermediate server, a given state identifier to the service request where the given state identifier is associated to a connection identity of the first persistent connection and where the association is stored in memory at the intermediate server.

In some implementations, the method may include transmitting, at the intermediate server, the service request to the platform server over a second persistent connection.

In some implementations, the method may include receiving, at the intermediate server, a response message over the second persistent connection, the response message having been generated by the platform server in response to the service request where the response message includes the given state identifier.

In some implementations, the method may include retrieving, at the intermediate server, the connection identity of the first persistent connection using the given state identifier where the given state identifier is the same state identifier transmitted within the service request. The given state identifier may be inserted into a header portion of the service request.

In some implementations, the method may include routing, at the intermediate server, the response message to a selected connection of the persistent connections with the edge servers where the selected connection is based on the retrieved connection identity. The persistent connections may be Web-Socket connections.

In some implementations, the intermediate server may maintain, in the memory, a second state identifier associated with an authentication exchange having been conducted between the computing device connected to the given edge server and the platform server. The second state identifier may be associated with a name value associated with that of the computing device. In such implementation, the method may include comparing, using the processor at the intermediate server, a device identifier located within the service request to the name value. If there is a match, the intermediate server may inject the second state identifier into the service request where the device identifier is associated with an identity of a given computing device operatively communicating with the given edge server. If the comparison is not a match, the intermediate server may send an unbind request to the given edge server where the unbind request causes the device identifier to be removed from a binding list of one or more device identifiers stored at the edge server. The second state identifier may be associated to the connection identity of the first persistent connection and where the association is stored in memory at the intermediate server.

In one aspect, the present disclosure describes a system, namely an intermediate server, including a processor and a memory, the memory storing instruction that, when executed by the processor, cause the processor to receive, by a port, a service request from a given edge server over a first persistent connection.

In some implementations, the instructions, when executed, further cause the processor to insert a given state identifier to the service request where the given state identifier is associated to a connection identity of the first persistent connection and where the association is stored in memory at the intermediate server.

In some implementations, the instructions, when executed, further cause the processor to transmit the service request to the platform server over a second persistent connection.

In some implementations, the instructions, when executed, further cause the processor to receive a response message over the second persistent connection, the response message having been generated by the platform server in response to the service request where the response message includes the given state identifier.

In some implementations, the instructions, when executed, further cause the processor to retrieve, at the intermediate server, the connection identity of the first persistent connection using the given state identifier where the given state identifier is the same state identifier transmitted within the service request. The given state identifier may be inserted into a header portion of the service request.

In some implementations, the instructions, when executed, further cause the processor to route the response message to a selected connection of the persistent connections with the edge servers where the selected connection is based on the retrieved connection identity. The persistent connections may be Web-Socket connections.

In some implementations, the intermediate server may maintain, in the memory, a second state identifier associated with an authentication exchange having been conducted between the computing device connected to the given edge server and the platform server. The second state identifier may be associated with a name value associated with that of the computing device. In such implementation, the intermediate server may compare, by the processor, a device identifier located within the service request to the name value. If there is a match, the intermediate server may inject the second state identifier into the service request where the device identifier is associated with an identity of a given computing device operatively communicating with the given edge server. If the comparison is not a match, the intermediate server may send an unbind request to the given edge server where the unbind request causes the device identifier to be removed from a binding list of one or more device identifiers stored at the edge server. The second state identifier may be associated to the connection identity of the first persistent connection and where the association is stored in memory at the intermediate server.

In one aspect, the present disclosure describes a non-transitory computer readable medium having instructions stored thereon, where the instructions, when executed by a processor, cause the processor to receive, by a port, a service request from a given edge server over a first persistent connection.

In some implementations, the instructions, when executed, further cause the processor to insert a given state identifier to the service request where the given state identifier is associated to a connection identity of the first persistent connection and where the association is stored in memory at the intermediate server.

In some implementations, the instructions, when executed, further cause the processor to transmit the service request to the platform server over a second persistent connection.

In some implementations, the instructions, when executed, further cause the processor to receive a response message over the second persistent connection, the response message having been generated by the platform server in response to the service request where the response message includes the given state identifier.

In some implementations, the instructions, when executed, further cause the processor to retrieve, at the intermediate server, the connection identity of the first persistent connection using the given state identifier where the given state identifier is the same state identifier transmitted within the service request. The given state identifier may be inserted into a header portion of the service request.

In some implementations, the instructions, when executed, further cause the processor to route the response message to a selected connection of the persistent connections with the edge servers where the selected connection is based on the retrieved connection identity. The persistent connections may be Web-Socket connections.

In some implementations, the intermediate server may maintain, in the memory, a second state identifier associated with an authentication exchange having been conducted between the computing device connected to the given edge server and the platform server. The second state identifier may be associated with a name value associated with that of the computing device. In such implementation, the intermediate server may compare, by the processor, a device identifier located within the service request to the name value. If there is a match, the intermediate server may inject the second state identifier into the service request where the device identifier is associated with an identity of a given computing device operatively communicating with the given edge server. If the comparison is not a match, the intermediate server may send an unbind request to the given edge server where the unbind request causes the device identifier to be removed from a binding list of one or more device identifiers stored at the edge server. The second state identifier may be associated to the connection identity of the first persistent connection and where the association is stored in memory at the intermediate server.

In one aspect, the present disclosure describes a method of routing message between a platform server and a plurality of end-point device via a connection server in a distributed computing environment. The method may include providing a platform server, a set of intermediary servers, and a set of edge servers, collectively defining a network where an end-point device communicates to an edge server of the set of edge servers, the set of edge servers communicates to the set of intermediary servers, and the set of intermediary servers communicates to a platform server.

In some implementations, the method may include receiving, by a port at the platform server, a first data message from a first end-point device over a first persistent connection where the first data message has been routed through a first intermediate server over a second persistent connection.

In some implementations, the method may include receiving, by the port at the platform server, a second data message from a second end-point device over a third persistent connection, wherein the second data message has been routed through a second intermediate server over a fourth persistent connection. The persistent connections may include WebSocket.

In some implementations, the method may include servicing, by a processor at the platform server, the first data message and the second data message where each of the first intermediate server and second intermediate server manages connectivity between the end-point devices and the platform servers. Each of the first intermediate server and second intermediate server may manage authentication sessions between the end-point devices and the platform servers. The platform server may service the first data message and the second data message by routing the messages to an back-office server selected from a group consisting of a persistence server, a database server, a customer relationship management (CRM) server, an enterprise resource planning (ERP) server, an operation support system (OSS) server, a business support system (BSS) server, and a data warehouse.

In one aspect, the present disclosure describes a system including a processor and a memory, the memory storing instruction that, when executed by the processor, cause the processor to receive, by a port, a first data message from a first end-point device over a first persistent connection where the first data message has been routed through a first intermediate server over a second persistent connection.

In some implementations, the instructions, when executed, further cause the processor to receive, by the port, a second data message from a second end-point device over a third persistent connection, wherein the second data message has been routed through a second intermediate server over a fourth persistent connection. The persistent connections may include WebSocket.

In some implementations, the instructions, when executed, further cause the processor to service the first data message and the second data message where each of the first intermediate server and second intermediate server manages connectivity between the end-point devices and the platform servers. Each of the first intermediate server and second intermediate server may manage authentication sessions between the end-point devices and the platform servers. The platform server may service the first data message and the second data message by routing the messages to an back-office server selected from a group consisting of a persistence server, a database server, a customer relationship management (CRM) server, an enterprise resource planning (ERP) server, an operation support system (OSS) server, a business support system (BSS) server, and a data warehouse.

In one aspect, the present disclosure describes a non-transitory computer readable medium having instructions stored thereon, where the instructions, when executed by a processor, cause the processor to receive, by a port, a first data message from a first end-point device over a first persistent connection where the first data message has been routed through a first intermediate server over a second persistent connection.

In some implementations, the instructions, when executed, further cause the processor to receive, by the port, a second data message from a second end-point device over a third persistent connection, wherein the second data message has been routed through a second intermediate server over a fourth persistent connection. The persistent connections may include WebSocket.

In some implementations, the instructions, when executed, further cause the processor to service the first data message and the second data message where each of the first intermediate server and second intermediate server manages connectivity between the end-point devices and the platform servers. Each of the first intermediate server and second intermediate server may manage authentication sessions between the end-point devices and the platform servers. The platform server may service the first data message and the second data message by routing the messages to an back-office server selected from a group consisting of a persistence server, a database server, a customer relationship management (CRM) server, an enterprise resource planning (ERP) server, an operation support system (OSS) server, a business support system (BSS) server, and a data warehouse.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIG. 4 illustrates example messaging code employed by the communication API protocol in accordance with an embodiment of the invention.

Figure 1:
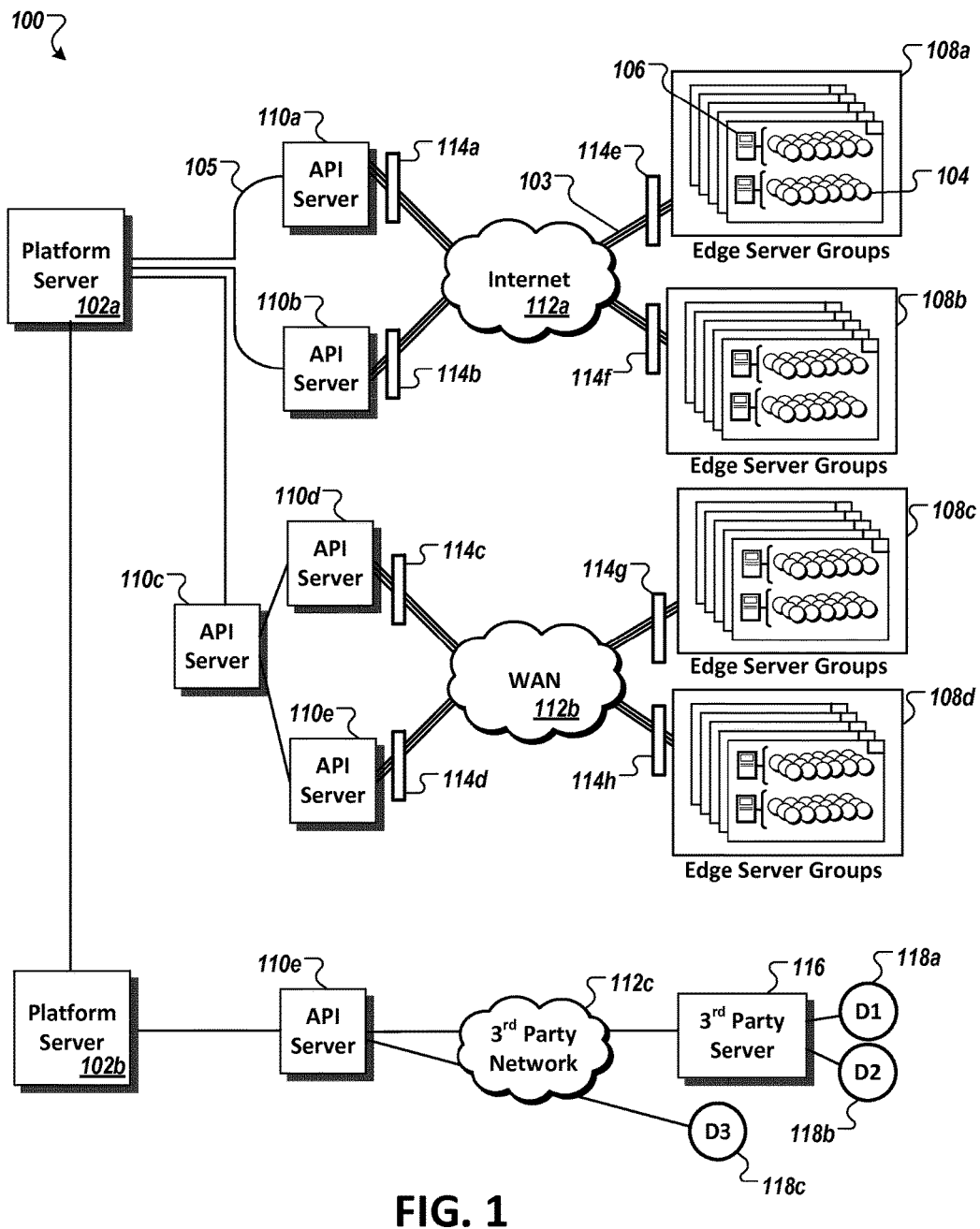
FIG. 1 is a block diagram of an example system for enabling communication between a platform server and a plurality of computing devices in accordance with an embodiment of the invention.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

FIG. 1 is a block diagram of an example system 100 for enabling communication between a platform server 102 and a plurality of computing devices 104 in accordance with an embodiment of the invention. Each of the computing devices 104 connects to an edge server 106 that services and maintains communication with a group of computing devices 108. A computing device 104, in some examples, is an electronic device that can communicate properties-, services-, and events-data and information relating to physical assets/devices, computer applications and systems, people, data objects, and platform services.

In some implementations, the computing device 104 is a sensor or a machinery at an industrial complex; a computer or an office equipment at a business or government office; a point-of-sale machine at a market place or a vending machine; a construction equipment or a vehicle; a power generation or distribution equipment; a power substation or transmission equipment; a building meter; a server; a networking or routing equipment; a smart appliance; an exercise machine; a medical device or a prosthesis device; a medical diagnostic device or a hospital equipment; a commercial vehicle or a transport container; a motor vehicle or an electric bicycle; a cellphone, a laptop, a tablet, an electronic reader; or a clothing electronic-tag.

An edge server, in some implementations, is an electronic device that has communication ports to interface to the endpoint device. The edge server may be, for example, but not limited to, a gateway device, a network server, a single board computer, a supervisory control and data acquisition system ("SCADA"), or a programmable logic controller ("PLC") The edge server may communicate to the endpoint device by industrial, commercial, computing, and military physical connection standards. These standards may include, for example, but not limited to, Modbus, RS-232, RS-422, RS-485, Serial-ATA, SCSI, FireWire (IEEE 1394), Ethernet, Universal Serial Bus, SONET ("Synchronous Optical Networking"), MIL-STD-1553, $I^2C$ ("Inter-Integrated Circuit"), CAN-bus ("controller area network"), ARINC 739 ("Avionics Digital Video Bus"), BACnet, LonWorks. The standards may also include health/medical communication standards, such as CEN ISO/IEEE 11073. The examples are merely for illustrative purposes. To this end, other types of standards may also be employed.

To serve data and information for sets of computing devices 104, one or more edge servers 106 may communicate to an intermediary server, referred to as a connection server 110 or an "API server 110", over a first persistent connection 103. The connection server 110, in turn, communicates to the platform server 102 over a second persistent connection 105. In essence, the connection server 110 form a persistent path between the platform server 102 and a given edge server 106 across the first persistent connection 103 and the second persistent connection 105.

Collectively, the platform servers 102, the connection servers 110, and the edge servers 106 form a federation of distributed computing systems. In some implementations, the platform servers 102 are business logic servers that maintain connectivity to a given computing device 104. In such instances, the platform server 102 may communicate to various back-office servers that provide service functions, such as searching, storing, and managing, among others, for the data and information of the computing device 104. To this end, the platform server 102 may merely serve to route data to and from various applications and systems with the computing devices 104.

In some implementations, the platform server 102 may manage the authentication process of the computing devices 104.

In some implementations, the platform server 102 routes data to and from the various back-office applications and systems. For example, when data is received from a specific computing device 104, the platform server 102 may route the data to another database server. In other embodiments, a third party application may request the data to be sent by the platform server.

Back-office servers may include, for example, third-party products for CRM/ERP ("customer relationship management" and/or "enterprise resource planning"), data analytics, Big Data Store (such as Hadoop, Data Warehouses, and various distributed file systems), identity management, billing, provisioning, and providing Web service. Examples of such back-office systems may include SAP® Enterprise Resource Planning "ERP", Salesforce® Customer Relationship Management "CRM", Operations Support System "OSS", and Business Support Systems "BSS" Components.

Various data storage and applications may communicate with the platform server 102. In some implementations, this communication may be by way of Web Services, Java Database Connectivity (JDBC), or native APIs.

In some implementations, the communication exchange between the connection servers 110 and the edge servers 106 occurs across a network infrastructure 112, such as the Internet 112a, a Wide-area network 112b, or a third-party network 112c. In turn, one or more connection servers 110 communicate to the platform server 102. The platform server 102, the connection servers 110, and the edge servers 106, collectively, forms a distributed computing system. In some implementations, a given connection server 110 communicates to a set of edge servers 106 through a set of network security equipment 114. The security equipment secures the connection server 110 and platform server 102 from the open network infrastructure 112. It also secures the groups of edge servers 106 and computing devices 104 from the same. The network security equipment 114 may include, for example, a firewall or Network Address Translation (NAT) protocol.

Figure 2:
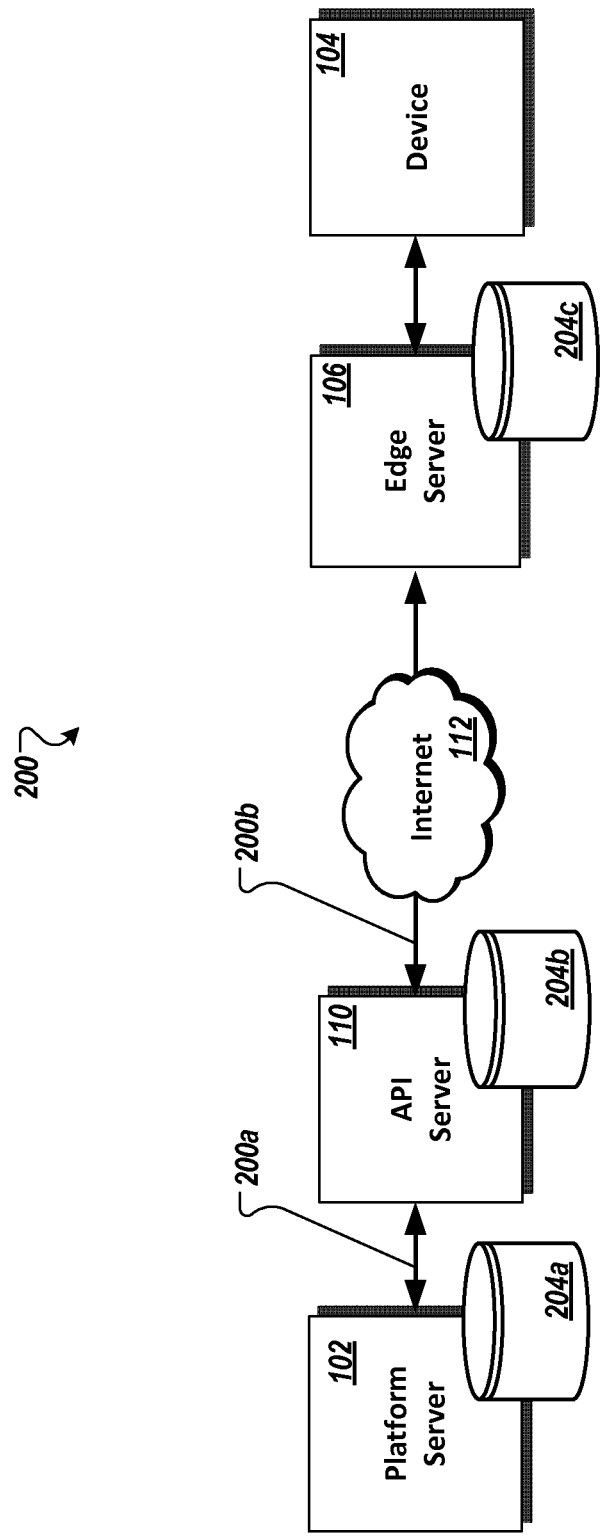
FIG. 2 is a block diagram of an example persistent-communication channels established between a given platform server and a given computing device in accordance with an embodiment of the invention.

FIG. 2 is a block diagram of an example persistent communication channel 200 established between a given platform server 102 and a given computing device 104 in accordance with an embodiment of the invention.

The platform server 102 runs a server-client application using an API protocol library 204a that manages the communication over the channel 200. The edge server 106 runs a server-client application 204c that runs the same communication API protocol library 204. To this end, messages being communicated inbound and outbound between the platform server 102 and the edge servers 106 are, for the most part, symmetrical in that these messages share the same message structure.

In some implementations, the API protocol library 204 is a binary Dynamic REST API. Examples of methods of communicating using the binary Dynamic REST APIs are described in co-pending and concurrently filed U.S. patent application Ser. No. 14/222,100, now U.S. Pat. No. 9,762,637, titled "SYSTEM AND METHOD OF USING BINARY DYNAMIC REST MESSAGES", filed Mar. 21, 2014, naming inventors Rick Bullotta, John Canosa, Bob DeRemer, and Mike Mahoney. This application is incorporated by reference in their entirety.

This symmetry is intended to reduce the complexity of operation of the connection server 110 as the connection server 110 can generally service each communicated message in the same manner without much regard to the source or target.

In some implementations, the communication API protocol generates each message with metadata relating to the connection. The connection server 110 may use the connection metadata to preserve state information at both the edge server 106 and the platform server 102. To this end, the state information for a given edge server 106 and a given platform server 102 is communicated within each message allowing the servers to be stateless. In some implementations, the connection metadata merely may include a message identifier, authentication state information, and routing information associated with a given persistent connection.

Figure 3:
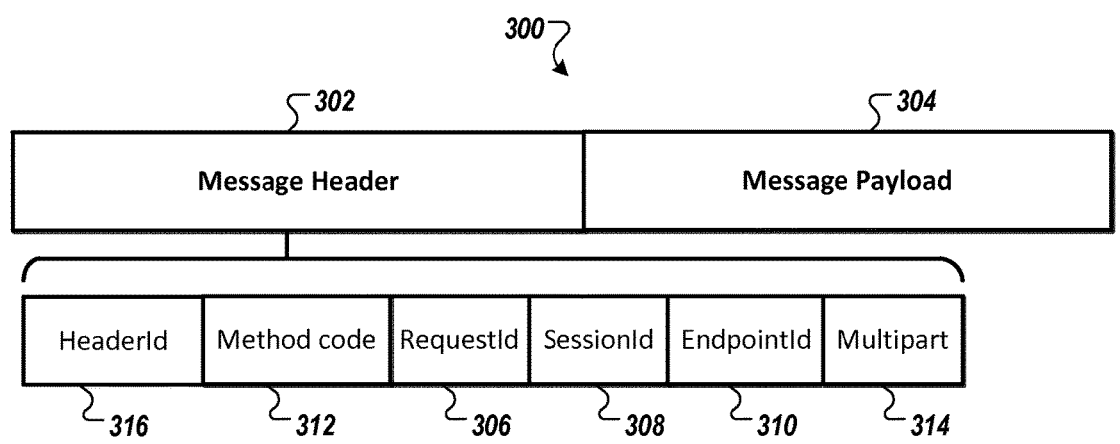
FIG. 3 is an example of a messaging structure of the communication API protocol in accordance with an embodiment of the invention.

FIG. 3 is an example message structure 300 of the communication API protocol 204 in accordance with an embodiment of the invention. The message structure 300 may include both a header 302 that provides the connection metadata and a body 304 that provides the message content.

In some implementations, the header 302 may include a session identification number 308, referred to as a "SessionId 308." The session identification number is preferably associated to both a given name identifier of an end-point device and a connection handle of a persistent connection. The association may be used by the connection server 110 to determine a binding path of a given computing device 104. The connection server 110 may use the session identification number to manage authentication session state on behalf of the platform server 102.

In some implementations, the connection server 204 may generate the session identification number 308 during an authentication process associated with a given computing device 104. During the process, the connection 204 stores the session identification number 308 and the communication handle from which the message was received. In some implementations, the session identification number 308 is preferably a 32-digit long binary number with the most-significant digit (MSB) first, though it can be of various data length and endian.

In some implementations, the header 302 may include an endpoint identification number 310, referred to as an "EndPointId 310", that is associated to a given persistent connection 202. The connection server can subsequently retrieve the connection handle using the endpoint identification number 310. The endpoint identification number 310 is preferably a 32-digit long binary number with the most-significant digit (MSB) first. The connection server 110 may use the endpoint identification number to preserve routing state information lost due to the multiplexing of the persistent connection.

The header 302 may include other information fields to improve the operational efficiency of the messaging protocol. In some implementations, the header 302 may include a request identification number 306, referred to as a "RequestId 306," that is associated to a given message. The request identification number 306 may be randomly generated or incrementally generated to be unique for a given persistent communication channel 200. The request identification number 306 may be employed to determine whether a service request has been fulfilled. In some implementations, the request identification number 306 is preferably a 24-digit long binary number with the most-significant digit (MSB) first, though it can be of various data length and endian.

In some implementations, the header 302 may include a message type field 312, referred to as a "Method code 312." The message field may include codes to allow for the quick identification of the type of message being received. For simple messages, such as an acknowledgement or error message, the message type field 312 may constitute the message. For request messages, the message type field 312 may include a code corresponding to a type of request. In some implementations, the request type message may be based on an HTTP framework.

In some implementations, the header 302 may include a multi-part message field 314, referred to as "Multipart 314." This field may be used to identify whether the message is a part of a group of message having the same request identification number 306. The header identification number 316 is preferably a 8-bit number.

FIG. 4 illustrates example message codes employed by the communication API protocol in accordance with an embodiment of the invention. The codes include HTTP-based request messages 318, HTTP-based success codes 320, HTTP-based server-error codes 322, and HTTP-based client-error codes 324.

In an aspect of an embodiment of the invention, the connection server 110 injects routing state information to an inbound message being sent to the platform server 102. The inventors have found that injecting state information over a stateless connection improves performance of the connection over typical stateful connections.

In having the routing state information embedded within each message, the connection server can complete a round-trip message transfer, in some implementations, using merely a lookup of the connection handle associated with the routing state identifier.

In another aspect of an embodiment of the invention, the connection server 110 injects the authentication state information to an inbound message being sent to the platform server 102. In having the session state embedded within the message, the connection server 110 takes over the managing of the authentication session, thus freeing resources for the platform server, preferably to manage more devices.

Figure 5:
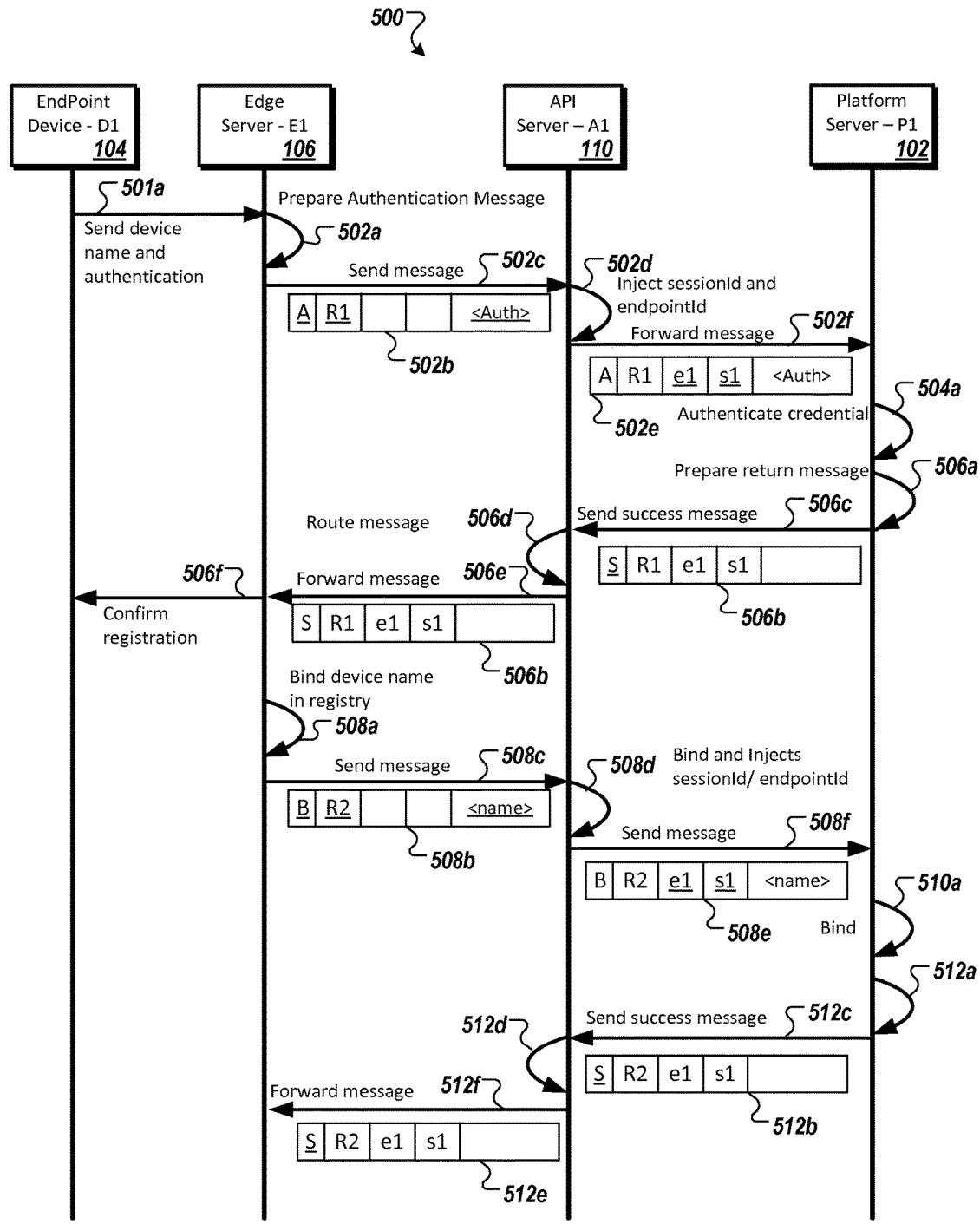
FIG. 5 is a swim-lane diagram of an example method of injecting state and routing information into a communication exchange between a platform server and an end-point device over a stateless persistent connection in accordance with an embodiment of the invention.

FIG. 5 is a swim-lane diagram of an example method 500 of injecting state and routing information into a communication exchange between a platform server 102 and an end-point device 104 over a multiplexed stateless persistent connection in accordance with an embodiment of the invention.

The method 500, in some implementations, begins with a computing device 104 (referred to as endpoint device "D1") registering with an edge server 106 (referred to as edge server "E1") (step 501a). In some implementations, the registration may be a handshake or some automated process of negotiation to establish communication between the end-point device "D1" and the edge server "E1". The edge server "E1" is an electronic device that has communication ports to interface to the endpoint device D1.

The edge server "E1", which is executing a client-side application using the API protocol library 204, prepares (step 502a) an authentication request message 502b in accordance, for example, with the request message structure as described in relation to FIGS. 3 and 4. The request message 502b may include a "RequestId R1" (shown as "R1") corresponding to the request identification number 306, as described in relation to FIG. 3. The edge server "E1" (106) then sends (step 502c) the authentication request message 502b to the connection server 110 over a first persistent connection established between the edge server "E1" (106) and the connection server "A1" (110).

The body of the message, in some implementations may include an authentication message (shown as "<Auth>"). The authentication message may include an authentication name and a corresponding authentication password. In some implementations, the authentication name may be the name identifier of the edge server "E1" (106). The name identifier may be random or descriptive. The name identifier may have some reference to the owner and type of device. For example, an electrocardiogram device no. 123 owned by the John Doe Medical Institute may have a descriptive name identifier of "JohnDMedInt_EKG_Dev_123."

In some implementations, the authentication name and the corresponding security code may be in an UTF8 data-type string ("Unicode Standard—8 bits"). The string may be of any length and may be preceded, in the message, by a length value corresponding to the string length in the UTF8 format. The corresponding security code may, for example, be a password, such as "GoodPassWord123". Of course, various values and length may be employed. In other implementations, the authentication message may be a security key, which can be an encrypted data string generated using a token associated with a name identifier of the edge server "E1". Various conventional authentication techniques may be employed.

In some implementations, the edge server "E1" (106) may require a second set of authentication credentials in addition to the authentication name and corresponding authentication password used in the authentication message. The second set of authentication credentials may be specific to the edge server "E1" (106) to prevent a non-authenticated computing devices from binding with it and may be employed.

Still referring to FIG. 5, upon receiving the authentication request message 502b, in some implementations, the connection server "A1" (110) injects (step 502d) "SessionId S1" (shown in FIG. 5 as "s1") and "EndpointId e1" (shown as "e1") into the received message 502b to produce message 502e. The connection server "A1" (110) then sends (step 502f) the message 502e to the platform server 102, referred to as the platform server "P1" (102), over a second persistent connection established between the connection server "A1" (110) and the platform server "P1" (102). The "EndpointId e1" may correspond to the endpoint identification number 310, as described in relation to FIG. 3, that is associated to the first persistent connection. The "SessionId s1" may correspond to the session identification number, as also described in relation to FIG. 3, that is associated to a given persistent connection and the name identifier belonging to the endpoint device D1 (104).

In some implementations, the received message 502b has a NULL or EMPTY value in the header fields 306 and 308. To this end, the "SessionId s1" and the "EndpointId e1" can merely replace the values there. In other implementations, the received message 502b is concatenated with the "SessionId s1" and the "EndpointId e1". Of course, various methods of injecting data into a data stream may be employed.

Upon receiving the message 502e, the platform server "P1" (102) processes (step 504a) the authentication request message. In some implementations, the platform server "P1" (102) authenticates the credentials of the endpoint device D1 (104) using an authentication registry that it maintains. In some implementations, the platform server "P1" (102) may route the message to a back-office authentication-server (not shown) to perform the authentication.

The platform server "P1" (102) then prepares a return message 506b (step 506a). The return message 506b may be related to the authentication process (for example, pass or not passed), or it may be merely be an acknowledgement of receipt of the message (for example, success receipt or receipt error). To this end, the return message 506b may be a status code, as described in relation to FIG. 4.

In some implementations, the platform server 102 prepares the return message 506b to include the "RequestId R1", the "SessionId s1", and the "EndpointId e1" as received in the request message 502e. In essence, the platform server "P1" (102) merely employs the metadata information of the received message to produce a return message, which may be an indicia of acknowledgement or success. The platform server "P1" (102) then sends the message 506b (step 506c) to the connection server 110 over the second persistent connection.

Upon receiving the message 506b, in some implementations, the connection server "A1" (110) may use the "EndPointId e1" to identify the connection to forward the message 506b (step 506d) to the Edge Server "E1" (106). To this end, no additional processing may be necessary to be performed at the connection server "A1" (110). In some implementations, the "EndPointId e1" may be indexed to the connection handle associated with the persistent connection. The index may have been stored at the connection server "A1" (110) within a hash table.

To this end, preserving state information for a roundtrip routing through a multiplexed persistent connection paradigm may collectively employ a single hash-table lookup of an identifier associated with a given persistent connection, a single write function to inject in the identifier into a message header, and a single read of the message header to retrieve the communication handle to the same persistent connection.

Referring still to FIG. 5, in some implementations, subsequent to an authentication exchange, the edge server "E1" (106) initiates a binding process. The binding process binds a path between the end-point device "D1" (104) and the platform server "P1" (102). At each node along the path, the binding process associates a connection handle of a persistent connection that points to the end-point device.

The binding process is synergistic with the usage of routing metadata. Routing metadata may allow for messages from the platform server to be quickly and efficiently returned to the end-point device.

In some implementations, the edge server "E1" (106) prepares a binding message 508a and sends the message 508b (step 508c) to the connection server "A1" (110) across the first persistent connection. The edge server "E1" (106) generates a "requestId R2". In some implementations, the request message 508b may include a "BIND" request code, as described in relation to FIG. 4 and as shown as "B" in message 508b. The payload of the request message 508b may include the name identifier of the endpoint device "D1" (104).

Upon receiving the bind request message 508b, in some implementations, the connection server "A1" (110) injects (step 508d) "SessionId S1" (shown in FIG. 5 as "s1") and "EndpointId e1" (shown as "e1") into the received message 508b to produce message 508e.

Additionally, the connection server "A1" (110) determines that the received message is a bind request. To this end, it adds the name identifier located within the payload 304 to its binding registry. In the registry, the name identifier may be associated with a connection handle of the first persistent connection. For example, the name identifier is used as an index value in a hash table having the connection handle.

The connection server "A1" (110) then sends (step 508f) the bind request message 508e to the platform server "P1" (102), over a second persistent connection.

Upon receiving the message 508e, in some implementations, the platform server "P1" (102) processes the bind request (step 510a). For example, it may add the name identifier to its binding registry.

In some implementations, the platform server "P1" (102) prepares a success message 512b (step 512a). The platform server "P1" (102) sends the success message 512b (step 512c) to the connection server "A1" (110) over the second persistent connection. Upon receiving the message 512b, the connection server "A1" (110) may use the "EndPointId e1" to identify the connection. The connection server "A1" (110) forwards the message 512e (step 512d) to the edge server "E1" (106).

In some implementations, the edge server "E1" (106) may send a message to the endpoint device "D1" (104) to acknowledge a successful registration process.

Figure 6:
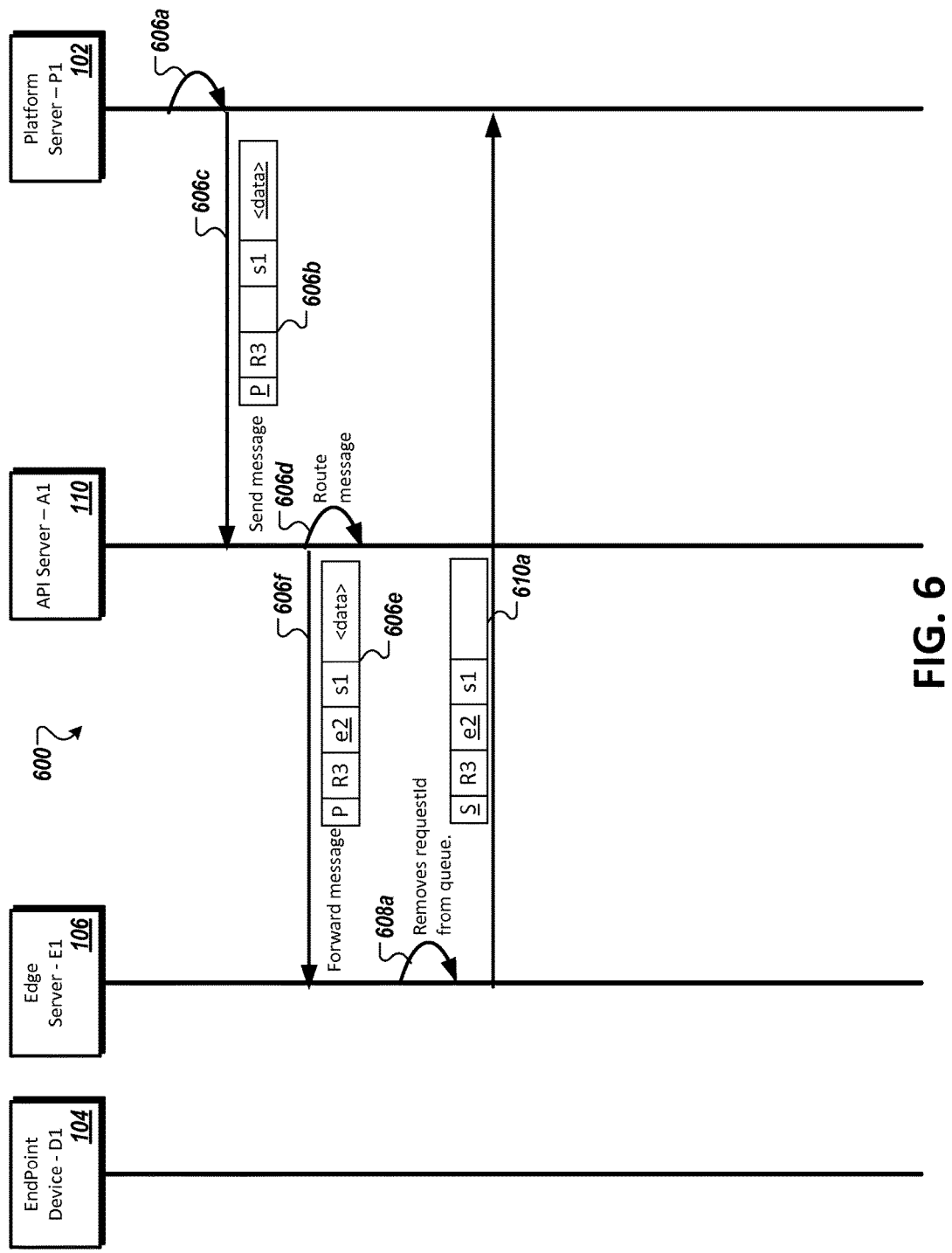
FIG. 6 is a swim-lane diagram of the method of injecting state and routing information into a data-request communication-exchange between a platform server and an end-point device over a stateless persistent connection in accordance with an embodiment of the invention.

FIG. 6 is a swim-lane diagram of the method 600 of communicating from the platform server 102 over a stateless persistent connection in accordance with an embodiment of the invention.

The method 600, in some implementations, begins with the platform server "P1" (102) preparing a request message 606b (step 606a) for the edge server "E1" (106).

The platform server "P1" (102) sends the request message 606b to the connection server "A1" (110) over the second persistent connection using a connection handle determined from its binding registry.

Upon receiving the message 606b, in some implementations, the connection server "D1" (110) determines that the message is an outbound message from the platform server "P1" (102). This determination may be based on the connection handle of the second persistent connection, or it may be based on the presence of a session identification number 308 within the message 606b. The connection server "D1" (110) may inject an "EndpointId e2" associated with the received connection handle for the second persistent connection (step 606d). The connection server "D1" (110) may identify the appropriate persistent connection for the message 606b using the name identifier in the message 606b and a corresponding connection handle stored in its binding registry. The connection server "D1" (110) then forwards the message 606e to the appropriate edge server "E1" (106) using the identified handle.

Upon receiving the message 606e, in some implementations, the edge server "E1" (106) sends back a success/acknowledge message 610a (step 610a) to the connection server "A1" (110) over the same persistent connection, namely the first persistent connection. The edge server "E1" (106) uses the requested data in the message's payload 304 (step 608a) and removes the data service request from its queue. The edge server "E1" (106) may generate a success message (step 608a) and sends to the connection server "A1" across the first persistent connection.

The connection server "A1" (110) receives the message 610a and relays the message to the platform server "P1" (102) over the second persistent connection using the "endPointId e2". Upon receiving the acknowledgment message 610a, in some implementations, the platform server "P1" (102) removes the request message from its queue.

Figure 7:
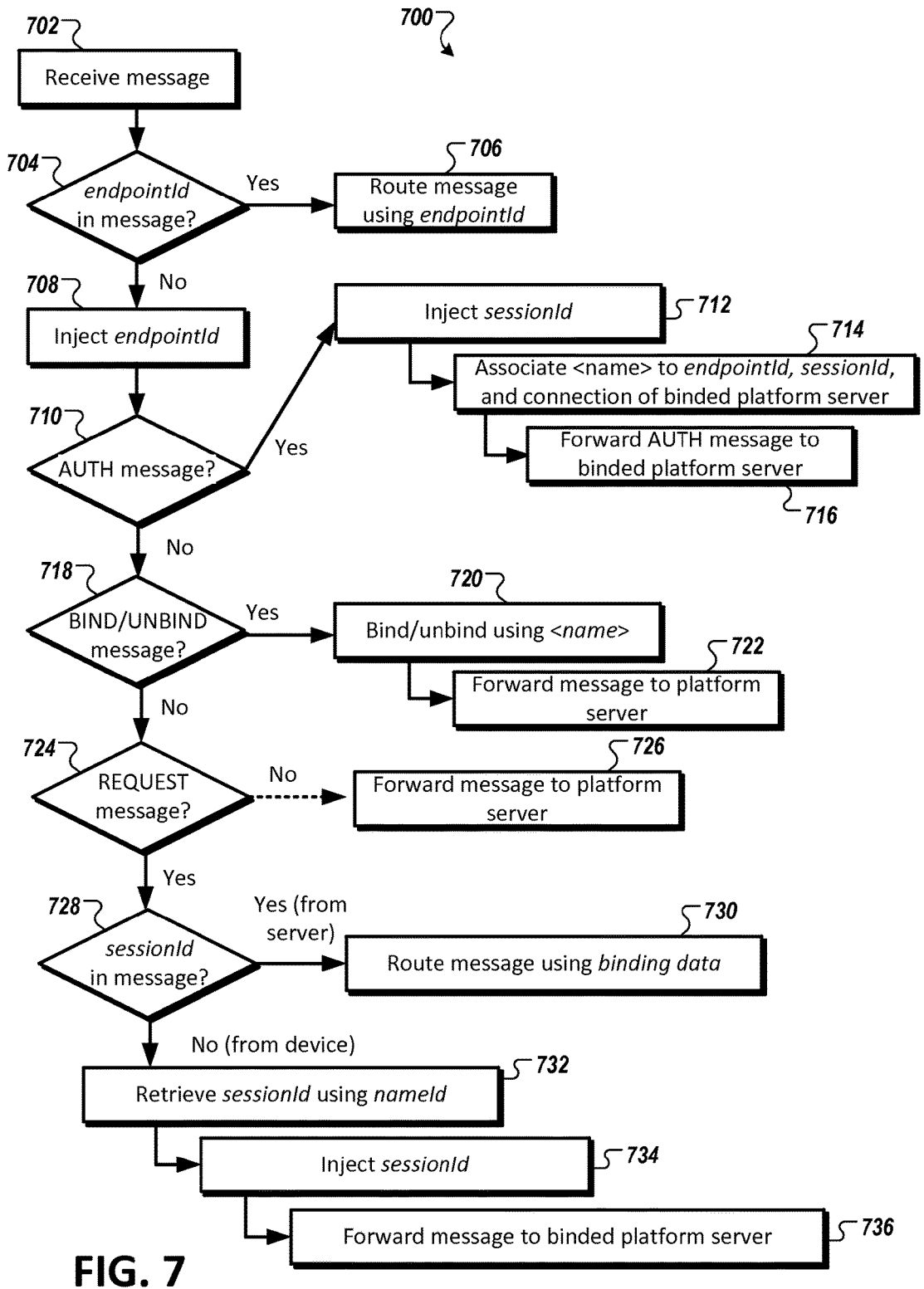
FIG. 7 is a flow chart for an example method of controlling a connection server in accordance with an embodiment of the invention.

FIG. 7 is a flow chart for an example method 700 of controlling a connection server 110 in accordance with an embodiment of the invention. In some implementations, the controls are based on policies that are executed from a client-side application operating at the connection servers 110. A policy may include, for example, rule-base methodology, a state machine, a model-based control, and/or a sequential logic.

Upon receiving a message (step 702), the connection server 110 determines whether an endpoint identification number 310 is present in the message (step 704), as described in relation to FIGS. 5 and 6. In some implementations, the endpoint identification number 310 is located in a fixed field within the message header 302. In other implementations, the connection server 110 may parse the message for the information. If an endpointId 310 is in the message, then the connection server 102 may route the message using the endpointId 310, as described in relation to FIGS. 3, 5, and 6.

If the endpointId 310 is NULL or empty, the connection server 110 may inject an identification number associated with a connection handle associated to the channel that the id was received.

The connection server 110 may then check the message method code 312 to determine the message type (step 710, 718, 724).

If the message type is an authentication message (step 710), the connection server 110 may inject the session identification number 308 into the message (step 712), as described in relation to FIGS. 5 and 6. The connection server 110 may bind the endpointId 310, the sessionId 308 and the connection (step 714), as described in relation to FIG. 5, and forward the message to the platform server 102 (step 716).

If the message type is a bind or unbind message (step 718), the connection server 110 may bind the name identifier located in the message to its binding registry (or remove the name identifier in the message from its binding registry) (step 720) and forward the message to the platform server 102 (step 722).

If the message type is a request message (step 724), the connection server 110 may merely forward the request message to the platform server 102 (step 726).

The connection server 110 may then check the request message to determine whether the sessionId is present (step 728). If present, the message may be routed to the respective edge server 106 using its binding registry to determine the appropriate connection handle. If not present, the connection server 110 may retrieve the SessionId using the nameId in the message (step 732), inject the SessionId into the message (step 734), and forward the message to the platform server (step 736).

Figure 8:
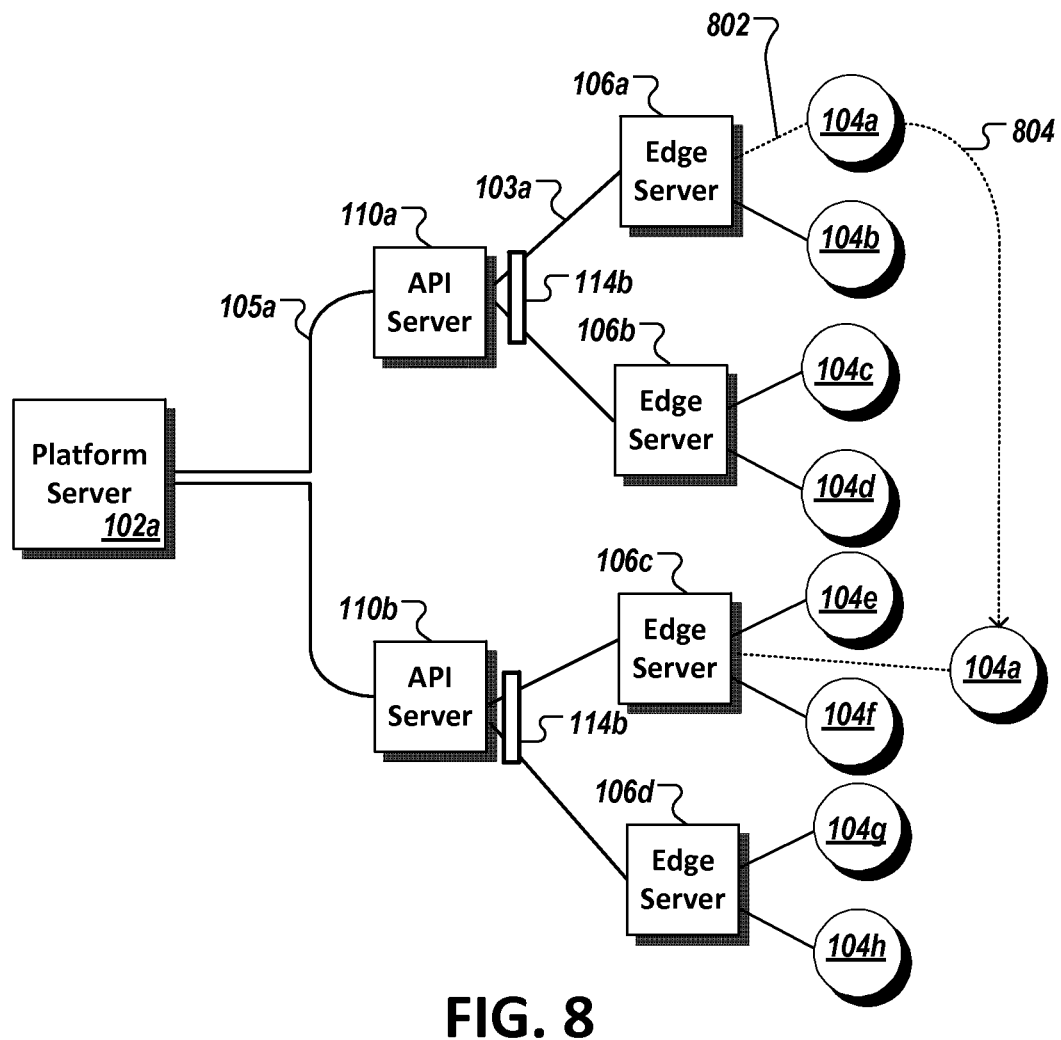
FIG. 8 illustrates a method of rebinding a persistent connection path for a computing device in accordance with an embodiment of the invention

FIG. 8 illustrates a method of binding and rebinding in accordance with an embodiment of the invention. The binding allows a given computing device 104 to be serviced by the federation while being connected to any end-point device within the federation without any knowledge of the device's own location or any networking or routing details about nodes within the federation. To this end, the federation allows messages from the computing device to freely route to the platform server regardless of the intermediate servers over this persistent-connection architecture.

The method initiates with a given computing device 104, namely the end-point device 104*a*, being registered, as described in relation to FIG. 5, with edge server 106*a*. The edge server 106 sends a bind request to a connection server 110*a* over persistent connection 103*a*. The bind request may include a name identifier of the end-point device 104 in the binding list. The connection server 110*a* forwards the bind request to the platform server 802 over persistent connection 105*a*. The connection server 110*a* also associates the end-point device 104*a* with the persistent connection 103*a* and stores the association in its binding registry. The association may be based on the connection handle of the persistent connection. The binding registry may be a data table or a hash table. The platform server 102*a* associates the end-point device 104*a* with persistent connection 105*a* and stores the association in its binding registry. To this end, when sending a request message to end-point device 104*a*, the platform server 102 retrieves the persistent connection 105 associated to the end-point device 104*a*.

Subsequent to binding, if the end-point device 106*a* moves to another edge server, namely edge server 106*c*, the end-point device 106*a* would de-register with the edge server 106*a*. The edge server 106*a* would send an unbind request to the primary server 102*a* through the bounded path (103*a*, 105*a*). The unbind request would remove the end-point device 106*a* from the binding registry of the connection server 110*a* and the platform server 102. The end-point device 106*a* would then register with the edge-server 106*c* and repeat the same binding process.

Figure 9:
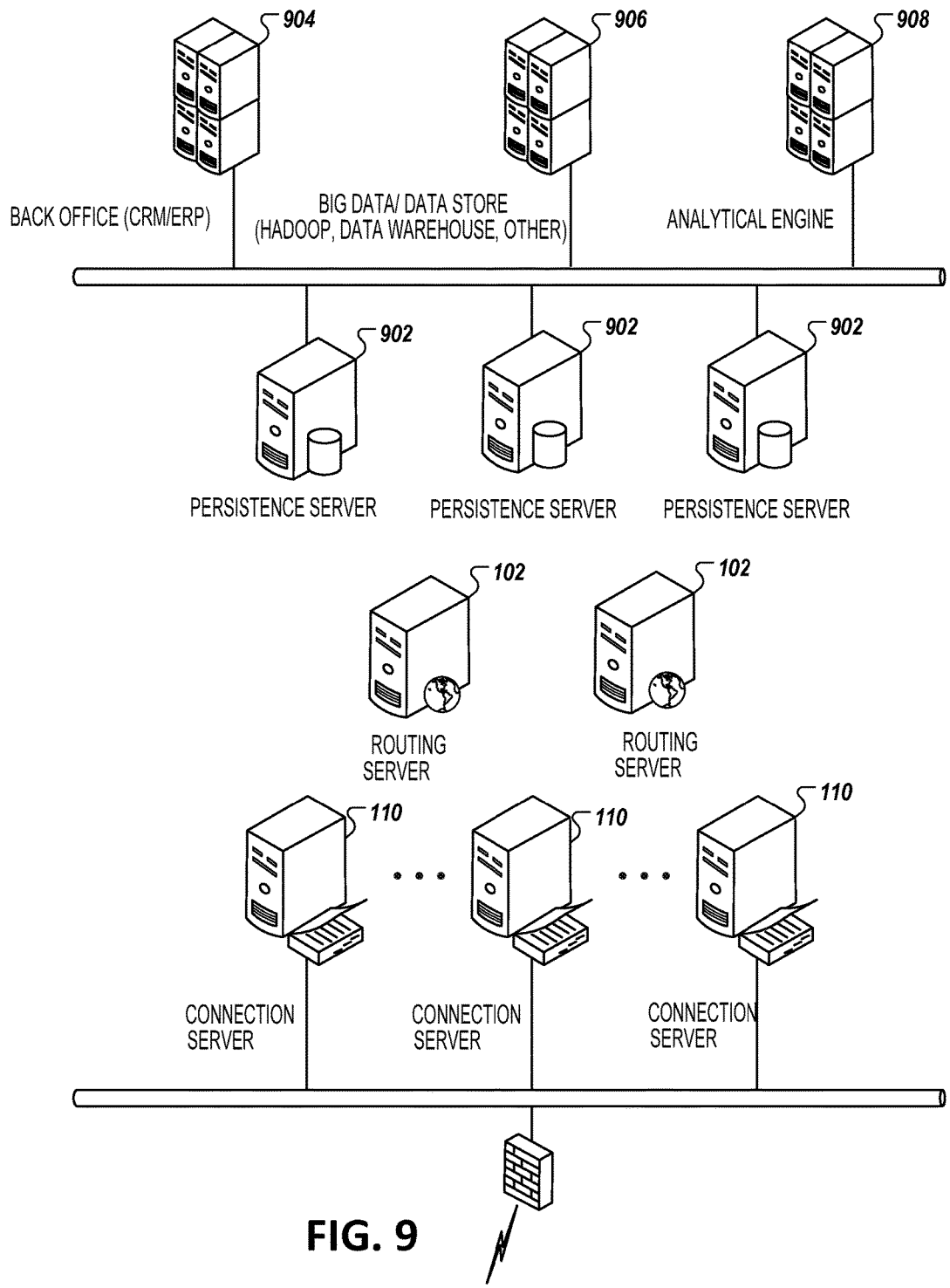
FIG. 9 is a block diagram of an example system in accordance with an embodiment of the invention.

FIG. 9 is a block diagram of a network 900 using the system 100 in accordance with an embodiment of the invention. The network 900 may include back-end office components, as described in FIG. 2.

In some implementations, the network 900 may include one or more persistent servers 902. The persistence servers can share the load from data being sent to the platform server 102, shown as routing servers 102. The persistence servers 902 may employ specific types of persistence objects, such as Streams and DataTable. Examples of Streams and DataTable are described in U.S. patent application Ser. No. 13/678,885, titled "METHODS FOR DYNAMICALLY GENERATING APPLICATION INTERFACE FOR MODELED ENTITY AND DEVICES THEREOF," filed Nov. 16, 2012. The application is incorporated by reference herein in its entirety.

In some implementations, the network 900 may include one or more back-office servers 904, such as CRM/ERP, including various servers as described in relation to FIG. 2.

In some implementations, the network 900 may include one or more Big Data and Data Store 906. Such servers 906 may communicate to the platform server 102 using Web protocols, such as Java Database Connectivity (JDBC) or native APIs. In some implementations, the platform server 102 may process an event to route the data to the appropriate database when data is received from a given computing device 104. Alternatively, a third party application may initiate an event.

Figure 10:
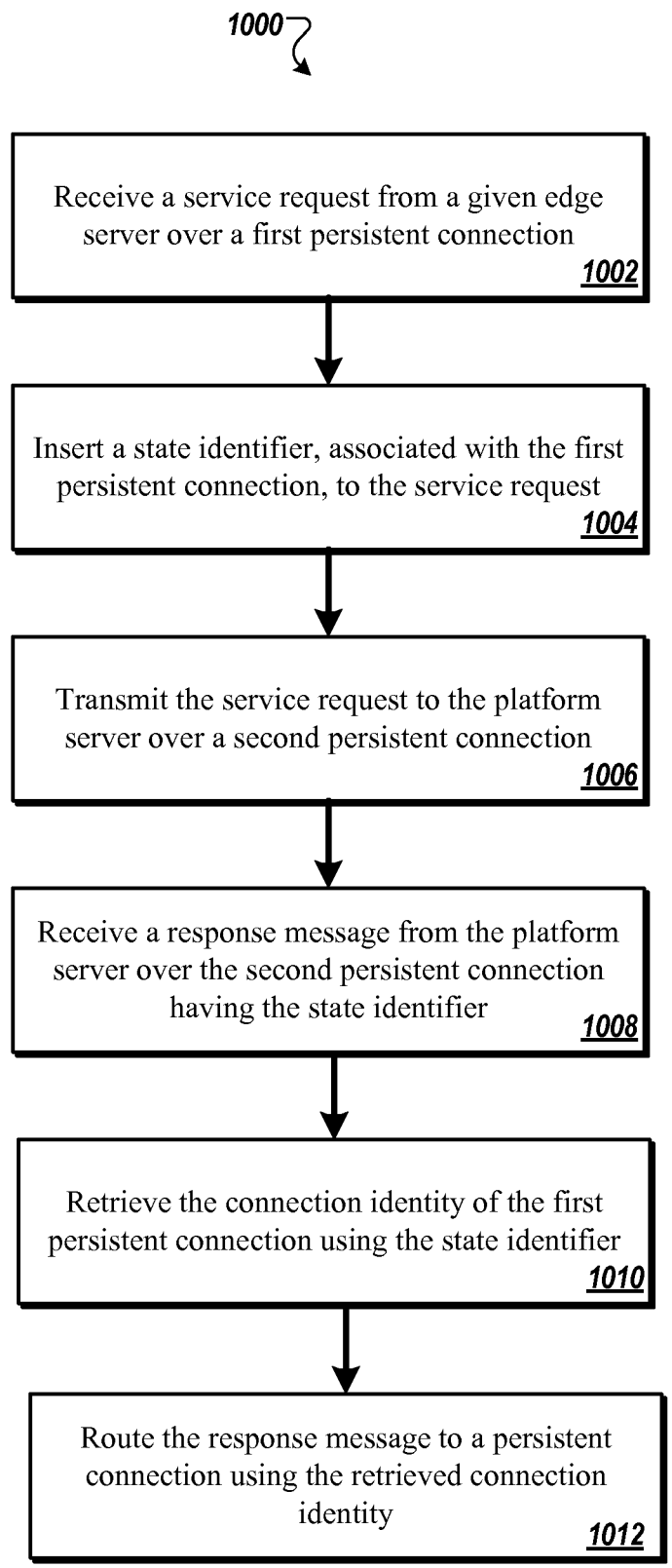
FIG. 10 is a flowchart of an example method of injecting state and routing information into a communication exchange between a platform server and an end-point device over a stateless persistent connection in accordance with an embodiment of the invention.

FIG. 10 is a flowchart of an example method 1000 of injecting the state and routing information into a communication exchange between a platform server 102 and an end-point device 104 over a stateless persistent connection in accordance with an embodiment of the invention. An example of a stateless persistent connection is a Web-Socket connection. The end-point device may be the edge server 106 or the computing device 104. The method 1000 may include providing one or more platform servers 102 connected to one or more intermediate servers 110. Each of the intermediate servers 110 may connect and maintain a persistent connection 200*a* to the platform server 102. The intermediate servers 102 may also communicate and maintain a number of unique persistent connections 200*b* with a plurality of edge servers.

In some implementations, a port at a given intermediate server 110 receives a service request from a given edge server 106 over a first persistent connection 200*b* (step 1002). The processor, at the intermediate server 110, inserts a session identifier to the service request (step 1004). The session identifier is associated to a connection identity of the first persistent connection. The association is stored in memory at the intermediate server. The intermediate server 110 is preferably "stateless" in that it does not retain state information associated with a given request message. In such implementations, the intermediate server 110 preferably does not maintain knowledge of whether a similar request message has been previously sent and which of a sequence of message action this message belongs thereto. Put another way, it forgets a given message after having received and forwarded it along.

Such stateless paradigm may reduce the workload of the intermediate server 110 as it can, thus, be configured to operate with a fewer set of instructions and with lower memory usage requirements. To this end, with less resource being required for a given connection, a given intermediate server 110 can service more numbers of computing devices 104 as compared to a comparable hardware system that operates the additional overhead work of maintaining such message state information. In some implementations, the given session identifier is injected into a header portion, such as the header 402, of each request message.

The intermediate server may maintain, in the memory, a second state identifier associated with an authentication session of a computing device 104. The second state identifier may be associated with a name value associated with the computing device 104. The second state identifier may also be associated to the connection identity of the first persistent connection. The association may be stored in the local memory of the intermediate server 110. In some implementations, the intermediate server 110 may maintain the association in a hash table. The table may use name value to index the second state identifier and a network handle created when the persistent connection was established.

In some implementations, the name value is preferably a non-network-based addressable identifier. Rather than a network addressable identifiers, which can be for example a uniform resource identifier (URI) or an Internet Protocol (IP) address, the name value can be a number sequence or a character string.

In some implementations, the intermediate server 110 transmits the service request to the platform server 102 over a second persistent connection (step 1006).

In some implementations, the intermediate server 110 receives a response message over the second persistent connection 200a. The response message may have been generated by the platform server in response to the service request and may include the session identifier (step 1008).

In some implementations, the intermediate server 110 retrieves the connection identity of the first persistent connection using the session identifier (step 1010). The session identifier is the same session identifier transmitted within the service request.

In some implementations, the intermediate server 110 routes the response message to a selected connection among the numbers of persistent connections established with the edge servers (step 1012). The selected connection may be based on the retrieved connection identity.

Figure 11:
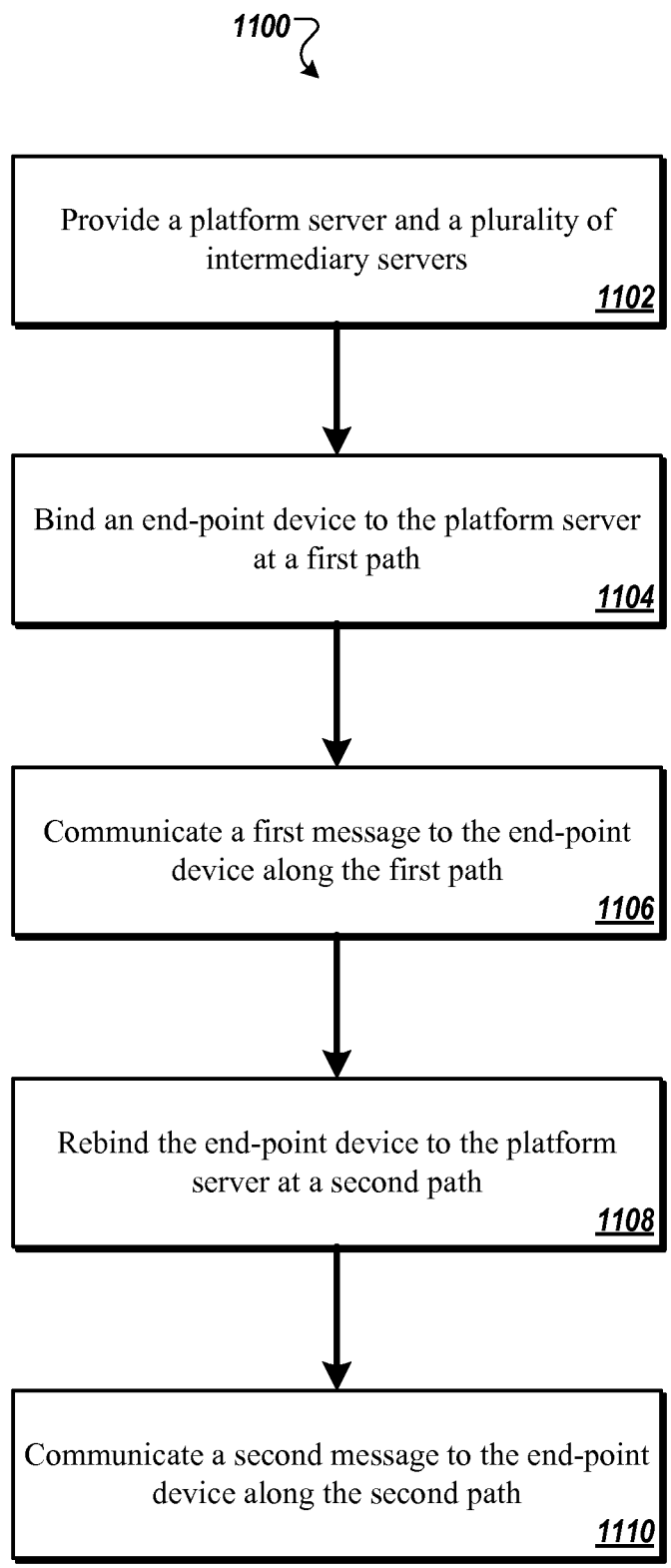
FIG. 11 is a flowchart of an example method of communication between two network nodes and an intermediary node over a persistent connection in accordance with an embodiment of the invention.

FIG. 11 is a flowchart of an example method 1100 of communication between two network nodes and an intermediary node over a persistent connection in accordance with an embodiment of the invention. In some implementations, the method 1100 begins at an initialized state at step 1102 where the two network nodes may include the platform server 102 and an end-point device, namely the computing device 104. The method 1100 may include providing one or more platform servers 102 connected to one or more intermediate servers 110. Each of the intermediate servers 110 may connect and maintain a persistent connection 200a to the platform server 102. The intermediate servers 102 may communicate and may maintain a number of unique persistent connections 200b with a plurality of edge servers 104.

In some implementations, the platform server 102 binds, at a first time instance, the end-point device 104 to the platform server 102 (step 1104). The binding, at the first instance, may associate with a first path across the network. The first path may be defined between the end-point device 104 and the platform server 102 across one or more intermediary servers and one or more edge servers.

In some implementations, the platform server 102 communicates a first message to the end-point device 104 along the first path (step 1106).

In some implementations, the platform server 102 rebinds, at a second instance, the end-point device 104 to the platform server 102 (step 1108). This may occur after the end-point device 104 has moved to an edge server different from the first path.

In some implementations, the platform server 102 communicates a second message to the end-point device along the second path (step 1110). To this end, the end-point device can move among different geographic locations without regard to its own knowledge of its location. Rather, the network may discover a path for message to flow to and from the platform server without any knowledge on the part of the end-point device 104.

Figure 12:
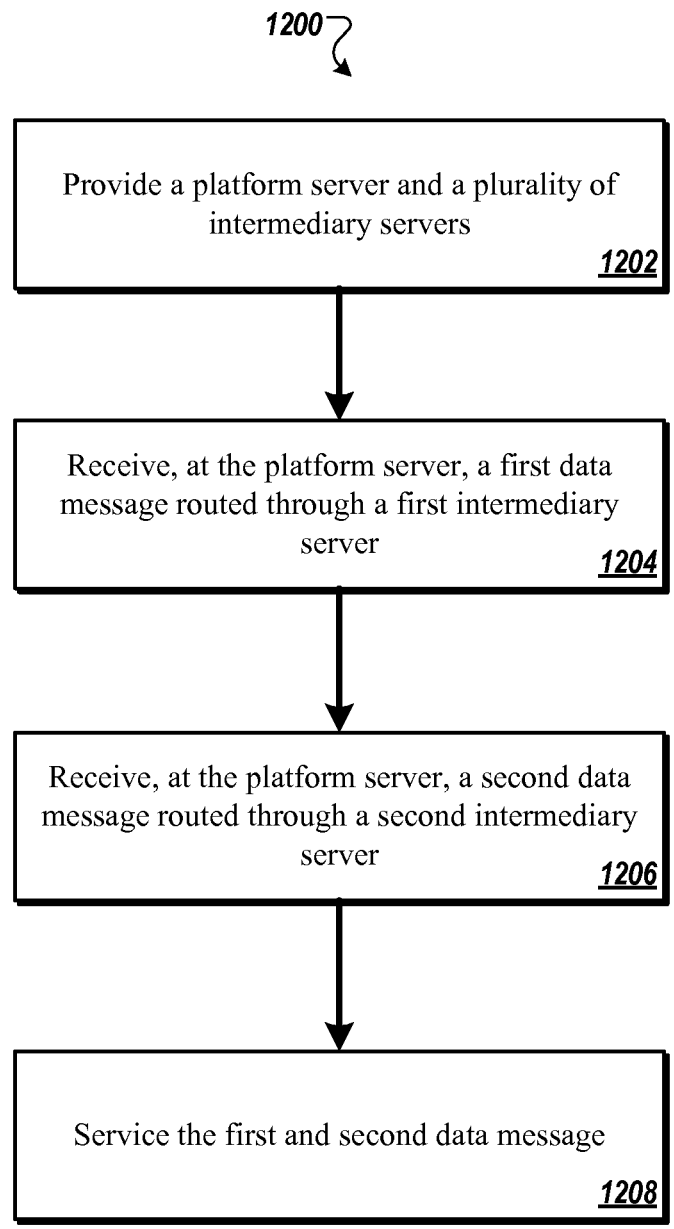
FIG. 12 is a flow chart of an example method 1202 of communication between the platform server and a plurality of an end-point device in accordance with an embodiment of the invention.

FIG. 12 is a flow chart of an example method 1200 of communication between the platform server and a plurality of an end-point device 104 in accordance with an embodiment of the invention. In some implementations, the method 1200 begins at an initialized state (step 1202). In some implementations, the platform server 102 receives a first data message from a first end-point device 104a over a first persistent connection 105a (step 1204). The first data message has been routed through a first intermediate server 110a over a second persistent connection 103a.

In some implementations, the platform server 102 receives a second data message from a second end-point device 104b over a third persistent connection 105b (step 1206). The second data message has been routed through a second intermediate server 110b over a fourth persistent connection 103b.

Each of the first intermediate server 110a and second intermediate server 110b may manage both the authentication sessions and the connectivity between the end-point devices 104 and the platform servers 102.

In some implementations, the platform server 102 services the first data message and the second data message (step 1208). The platform server 102 may service the first data message and the second data message by routing the messages to a back-office server. As described in relation to FIG. 2, the back-office server may include, for example, a persistence server, a database server, a customer relationship management (CRM) server, an enterprise resource planning (ERP) server, an operation support system (OSS) server, a business support system (BSS) server, or a data warehouse.

Figure 13:
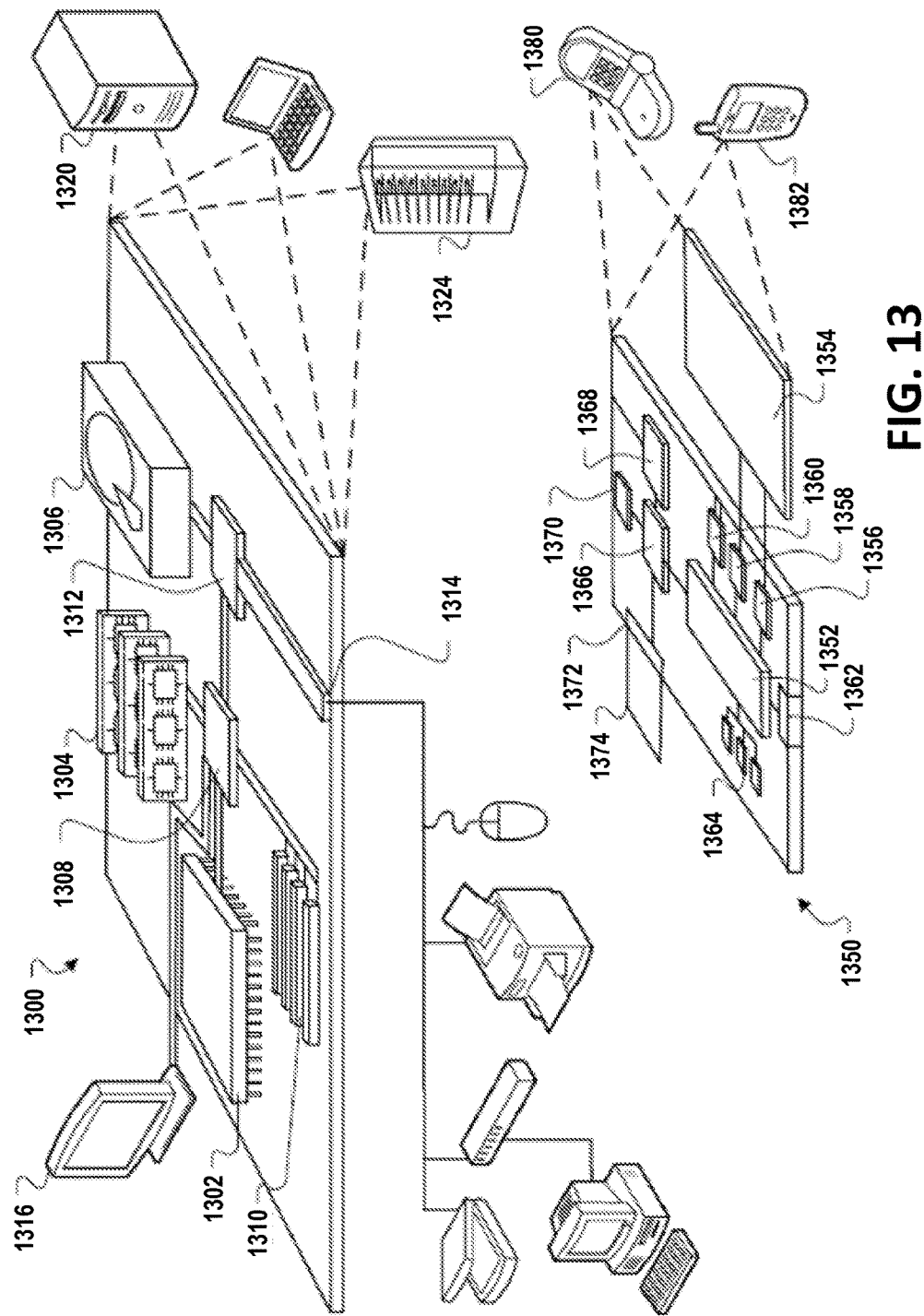
FIG. 13 is a block diagram of a computing device and a mobile computing device.

FIG. 13 shows an example of a computing device 1300 and a mobile computing device 1350 that can be used to implement the techniques described in this disclosure. The computing device 1300 is intended to represent various forms of digital computers, such as laptops, desktops, workstations, personal digital assistants, servers, blade servers, mainframes, and other appropriate computers. The mobile computing device 1350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1300 may include a processor 1302, a memory 1304, a storage device 1306, a high-speed interface 1308 connecting to the memory 1304 and multiple high-speed expansion ports 1310, and a low-speed interface 1312 connecting to a low-speed expansion port 1314 and the storage device 1306. Each of the processor 1302, the memory 1304, the storage device 1306, the high-speed interface 1308, the high-speed expansion ports 1310, and the low-speed interface 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as a display 1316 coupled to the high-speed interface 1308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1304 stores information within the computing device 1300. In some implementations, the memory 1304 is a volatile memory unit or units. In some implementations, the memory 1304 is a non-volatile memory unit or units. The memory 1304 may also be another form of computer-readable medium, such as a magnetic or optical disk.

The storage device 1306 is capable of providing mass storage for the computing device 1300. In some implementations, the storage device 1306 may be or contain a computer-readable medium, such as a floppy disk device, a hard disk device, an optical disk device, or a tape device, a flash memory or various solid state memory device, or an array of devices, including devices in a storage area network or various configurations. Instructions can be stored in an information carrier. The instructions, when executed by one or more processing devices (for example, processor 1302), perform one or more methods, such as those described above. The instructions can also be stored by one or more storage devices such as computer- or machine-readable mediums (for example, the memory 1304, the storage device 1306, or memory on the processor 1302).

The high-speed interface 1308 manages bandwidth-intensive operations for the computing device 1300, while the low-speed interface 1312 manages lower bandwidth-intensive operations. Such allocation of functions is an example only. In some implementations, the high-speed interface 1308 is coupled to the memory 1304, the display 1316 (e.g., through a graphics processor or accelerator), and to the high-speed expansion ports 1310, which may accept various expansion cards (not shown). In the implementations, the low-speed interface 1312 is coupled to the storage device 1306 and the low-speed expansion port 1314. The low-speed expansion port 1314, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. In addition, it may be implemented in a personal computer such as a laptop computer 1322. It may also be implemented as part of a rack server system 1324. Alternatively, components from the computing device 1300 may be combined with other components in a mobile device (not shown), such as a mobile computing device 1350. Each of such devices may contain one or more of the computing device 1300 and the mobile computing device 1350, and an entire system may be made up of multiple computing devices communicating with each other.

The mobile computing device 1350 may include a processor 1352, a memory 1364, an input/output device such as a display 1354, a communication interface 1366, and a transceiver 1368, among other components. The mobile computing device 1350 may also be provided with a storage device, such as a micro-drive or other device, to provide additional storage. Each of the processor 1352, the memory 1364, the display 1354, the communication interface 1366, and the transceiver 1368, are interconnected using various buses, and several of the components may be mounted on a common motherboard or in other manners as appropriate.

The processor 1352 can execute instructions within the mobile computing device 1350, including instructions stored in the memory 1364. The processor 1352 may be implemented as a chipset of chips that include separate and multiple analog and digital processors. The processor 1352 may provide, for example, for coordination of the other components of the mobile computing device 1350, such as control of user interfaces, applications run by the mobile computing device 1350, and wireless communication by the mobile computing device 1350.

The processor 1352 may communicate with a user through a control interface 1358 and a display interface 1356 coupled to the display 1354. The display 1354 may be, for example, a TFT (Thin-Film-Transistor Liquid Crystal Display) display or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may provide communication with the processor 1352, so as to enable near area communication of the mobile computing device 1350 with other devices. The external interface 1362 may provide, for example, for wired communication in some implementations, or for wireless communication in other implementations, and multiple interfaces may also be used.

The memory 1364 stores information within the mobile computing device 1350. The memory 1364 can be implemented as one or more of a computer-readable medium or media, a volatile memory unit or units, or a non-volatile memory unit or units. An expansion memory 1374 may also be provided and connected to the mobile computing device 1350 through an expansion interface 1372, which may include, for example, a SIMM (Single In Line Memory Module) card interface. The expansion memory 1374 may provide extra storage space for the mobile computing device 1350, or may also store applications or other information for the mobile computing device 1350. Specifically, the expansion memory 1374 may include instructions to carry out or supplement the processes described above, and may include secure information also. Thus, for example, the expansion memory 1374 may be provide as a security module for the mobile computing device 1350, and may be programmed with instructions that permit secure use of the mobile computing device 1350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 1352), perform one or more methods, such as those described above. The instructions can also be stored by one or more storage devices, such as one or more computer- or machine-readable mediums (for example, the memory 1364, the expansion memory 1374, or memory on the processor 1352). In some implementations, the instructions can be received in a propagated signal, for example, over the transceiver 1368 or the external interface 1362.

The mobile computing device 1350 may communicate wirelessly through the communication interface 1366, which may include digital signal processing circuitry where necessary. The communication interface 1366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1368 using a radio-frequency. In addition, short-range communication may occur, such as using a Bluetooth®, Wi-Fi™, or other such transceiver (not shown). In addition, a GPS (Global Positioning System) receiver module 1370 may provide additional navigation- and location-related wireless data to the mobile computing device 1350, which may be used as appropriate by applications running on the mobile computing device 1350.

The mobile computing device 1350 may also communicate audibly using an audio codec 1360, which may receive spoken information from a user and convert it to usable digital information. The audio codec 1360 may likewise generate audible sound for a user, such as through a speaker, e.g., in a handset of the mobile computing device 1350. Such sound may include sound from voice telephone calls, may include recorded sound (e.g., voice messages, music files, etc.) and may also include sound generated by applications operating on the mobile computing device 1350.

The mobile computing device 1350 may be implemented in a number of different forms, as shown in the figure. For example, it may be implemented as a cellular telephone 1380. It may also be implemented as part of a smart-phone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that may include a back end component (e.g., as a data server), or that may include a middleware component (e.g., an application server), or that may include a front end component (e.g., a client computer having a graphical user interface or a Web browser through which a user can interact with an implementations of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, a system and method for injecting state and routing information into a communication exchange between a platform server and an end-point device over a stateless persistent connection are provided. Having described certain implementations of methods and apparatus for supporting injection of the state and routing information into the communication exchange, it will now become apparent to one of skill in the art that other implementations incorporating the concepts of the disclosure may be used.

Moreover, in view of the structure, functions and apparatus of the systems and methods described here, in some implementations, a system and method for communication over a set of persistent connections between two network nodes and an intermediary node are provided. Having described certain implementations of methods and apparatus for supporting communication over the persistent connection, it will now become apparent to one of skill in the art that other implementations incorporating the concepts of the disclosure may be used.

Moreover, in view of the structure, functions and apparatus of the systems and methods described here, in some implementations, a system and method for communication over a set of persistent connections between two network nodes and an intermediary node are provided. Having described certain implementations of methods and apparatus for supporting communication over the persistent connection, it will now become apparent to one of skill in the art that other implementations incorporating the concepts of the disclosure may be used.

Therefore, the disclosure should not be limited to certain implementations, but rather should be limited only by the spirit and scope of the following claims.

What is claimed:

1. A computer-implemented method of facilitating communication between a platform server and a plurality of end-point devices via stateless intermediary servers, the method comprising:
   providing a platform server, a set of stateless intermediary servers, and a set of edge servers, collectively defining a network, wherein
      an end-point device, comprising a computing device having sensors located thereon, communicates data acquired via the sensors to an edge server of the set of edge servers,
      the set of edge servers communicates to the set of stateless intermediary servers,
      the set of stateless intermediary servers communicates to the platform server, and
      the stateless intermediary servers are stateless connection managers that do not maintain state information of a given received or transmitted message;
   receiving, by a port at the platform server, over a first persistent connection, a first data message originating from an end-point device operatively coupled to a first edge server,
      wherein the first data message has been routed through a first intermediary server of the set of stateless intermediary servers over a second persistent connection,
      wherein first persistent connection is persistently maintained between the platform server and the first intermediary server, and the second persistent connection is persistently maintained between the first intermediary server and the first edge server, such that the first data message passes over the first persistent connection and the second persistent connection in series, and
      wherein the first intermediary server is stateless such that no state information associated with the first message is maintained by the first intermediary server;
   receiving, by the port at the platform server, over a third persistent connection, a second data message originating from a second end-point device operatively coupled to a second edge server,
      wherein the second data message has been routed through a second intermediary server of the set of stateless intermediary servers over a fourth persistent connection,
      wherein the third persistent connection is persistently maintained between the platform server and the second intermediary server, and the fourth persistent connection is persistently maintained between the second intermediary server and the second edge server, such that the second data message passes over the third persistent connection and the fourth persistent connection in series, and
      wherein the second intermediary server is stateless such that no state information associated with the second message is maintained by the second intermediary server; and
   servicing, by a processor at the platform server, the first data message and the second data message by routing the first and second messages to a back-office server selected from the group consisting of a persistence server, a database server, a customer relationship management (CRM) server, an enterprise resource planning (ERP) server, an operation support system (OSS) server, a business support system (BSS) server, and a data warehouse,
   wherein each of the first intermediary server and second intermediary server manages connectivity between the end-point devices and the platform server.

2. The computer-implemented method of claim 1, wherein each of the first intermediary server and second intermediary server manages authentication sessions between the end-point devices and the platform server.

3. The computer-implemented method of claim 1, wherein the platform server comprises a single physical server.

4. The computer-implemented method of claim 1, wherein the platform server comprises a plurality of physical servers.

5. The computer-implemented method of claim 1, wherein the first, second, third, and fourth persistent connections comprise Web Socket connections.

6. A non-transitory computer readable medium having instruction stored thereon, wherein the instructions, when executed by a processor at a platform server, cause the processor to:
   receive, by a port, over a first persistent connection, a first data message originating from a first end-point device operatively coupled to a first edge server,
      wherein the platform server, a set of stateless intermediary servers, and a set of edge servers, collectively define a network, wherein an end-point device, comprising a computing device having sensors located thereon, communicates data acquired via the sensors to an edge server of the set of edge servers, the set of edge servers communicates to the set of stateless intermediary servers, and the set of stateless intermediary servers communicates to the platform server;
      wherein the first data message has been routed through a first intermediary server of the set of stateless intermediary servers over a second persistent connection,
      wherein first persistent connection is persistently maintained between the platform server and the first intermediary server, and the second persistent connection is persistently maintained between the first intermediary server and the first edge server, such that the first data message passes over the first persistent connection and the second persistent connection in series, and
      wherein the first intermediary server is stateless such that no state information associated with the first message is maintained by the first intermediary server;
   receive, by the port, over a third persistent connection, a second data message originating from a second end-point device operatively coupled to a second end-point device,
      wherein the second data message has been routed through a second intermediary server of the set of stateless intermediary servers over a fourth persistent connection,
      wherein the third persistent connection is persistently maintained between the platform server and the second intermediary server, and the fourth persistent connection is persistently maintained between the second intermediary server and the second edge server, such that the second data message passes over the third persistent connection and the fourth persistent connection in series, and wherein the second intermediary server is stateless such that no state information associated with the second message is maintained by the second intermediary server; and service the first data message and the second data message by routing the first and second messages to a back-office server selected from the group consisting of a persistence server, a database server, a customer relationship management (CRM) server, an enterprise resource planning (ERP) server, an operation support system (OSS) server, a business support system (BSS) server, and a data warehouse, wherein each of the first intermediary server and second intermediary server manages connectivity between the end-point devices and the platform server.

7. The computer readable medium of claim 6, wherein each of the first intermediary server and second intermediary server manages authentication sessions between the end-point devices and the platform server.

8. The computer readable medium of claim 6, wherein the platform server comprises a single physical server.

9. The computer readable medium of claim 6, wherein the platform server comprises a plurality of physical servers.

10. The computer readable medium of claim 6, wherein the first, second, third, and fourth persistent connections comprise Web Socket connections.

11. A system comprising:
a processor;
a memory, the memory storing instructions that, when executed by the processor, cause the processor to:
receive, by a port, over a first persistent connection, a first data message originating from a first end-point device operatively coupled to a first edge server,
wherein the platform server, a set of stateless intermediary servers, and a set of edge servers, collectively define a network, wherein an end-point device, comprising a computing device having sensors located thereon, communicates data acquired via the sensors to an edge server of the set of edge servers, the set of edge servers communicates to the set of stateless intermediary servers, and
wherein the first data message has been routed through a first intermediary server of the set of stateless intermediary servers over a second persistent connection,
wherein first persistent connection is persistently maintained between the platform server and the first intermediary server, and the second persistent connection is persistently maintained between the first intermediary server and the first edge server, such that the first data message passes over the first persistent connection and the second persistent connection in series, and wherein the first intermediary server is stateless such that no state information associated with the first message is maintained by the first intermediary server;

receive, by the port, over a third persistent connection, a second data message originating from a second end-point device operatively coupled to a second edge server, wherein the second data message has been routed through a second intermediary server of the set of stateless intermediary servers over a fourth persistent connection, wherein the third persistent connection is persistently maintained between the platform server and the second intermediary server, and the fourth persistent connection is persistently maintained between the second intermediary server and the second edge server, such that the second data message passes over the third persistent connection and the fourth persistent connection in series, and wherein the second intermediary server is stateless such that no state information associated with the second message is maintained by the second intermediary server; and service the first data message and the second data message by routing the first and second messages to a back-office server selected from the group consisting of a persistence server, a database server, a customer relationship management (CRM) server, an enterprise resource planning (ERP) server, an operation support system (OSS) server, a business support system (BSS) server, and a data warehouse, wherein each of the first intermediary server and second intermediary server manages connectivity between the end-point devices and the platform server.

12. The system of claim 11, wherein the platform server comprises a single physical server.

13. The system of claim 11, wherein the platform server comprises a plurality of physical servers.

14. The system of claim 11, wherein the first, second, third, and fourth persistent connections comprise Web Socket connections.

15. The system of claim 11, wherein each of the first intermediary server and second intermediary server manages authentication sessions between the end-point devices and the platform servers.

* * * * *